United States Patent
Tone

(10) Patent No.: US 10,649,957 B2
(45) Date of Patent: May 12, 2020

(54) DISPLAY SYSTEM, INPUT DEVICE, DISPLAY DEVICE, AND DISPLAY METHOD

(71) Applicant: Sharp Kabushiki Kaisha, Sakai, Osaka (JP)

(72) Inventor: Masanobu Tone, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 221 days.

(21) Appl. No.: 15/607,769

(22) Filed: May 30, 2017

(65) Prior Publication Data

US 2017/0344168 A1 Nov. 30, 2017

(30) Foreign Application Priority Data

May 31, 2016 (JP) .................................. 2016-108721
Apr. 6, 2017 (JP) .................................. 2017-076121

(51) Int. Cl.
*G06F 16/13* (2019.01)
*H04B 1/44* (2006.01)
*G06F 3/0354* (2013.01)
*G06F 9/54* (2006.01)
*G06F 3/0488* (2013.01)
*G06F 3/0484* (2013.01)
*G06F 3/038* (2013.01)
*H04B 1/3888* (2015.01)

(52) U.S. Cl.
CPC .............. *G06F 16/13* (2019.01); *G06F 3/038* (2013.01); *G06F 3/03545* (2013.01); *G06F 3/0488* (2013.01); *G06F 3/04845* (2013.01); *G06F 9/543* (2013.01); *H04B 1/3888* (2013.01); *H04B 1/44* (2013.01)

(58) Field of Classification Search
None
See application file for complete search history.

(56) References Cited

U.S. PATENT DOCUMENTS

| 5,404,442 A * | 4/1995 | Foster .................... G06F 3/0481 715/210 |
| 2013/0191769 A1* | 7/2013 | Park ...................... G06F 3/0488 715/770 |
| 2014/0245139 A1* | 8/2014 | Lee ........................ G06F 3/0488 715/702 |
| 2015/0326575 A1* | 11/2015 | Ramirez Flores ...... G06F 21/00 726/5 |

FOREIGN PATENT DOCUMENTS

JP 4074982 B2 4/2008

* cited by examiner

*Primary Examiner* — Christopher J Kohlman
(74) *Attorney, Agent, or Firm* — Keating & Bennett, LLP

(57) ABSTRACT

A pen stores a plurality of pieces of object data, and a control device displays the plurality of pieces of object data stored in the pen in a first display area of a touch panel display device as thumbnails in response to a paste operation performed by using the pen. The control device displays, in a second display area of the touch panel display device, a piece of object data selected from among the plurality of pieces of object data displayed as thumbnails in response to a selection operation performed by using the pen.

18 Claims, 33 Drawing Sheets

FIG. 20

| STORAGE UNIT 120 | | | |
|---|---|---|---|
| | ATTRIBUTE DATA | | OBJECT DATA |
| | DATE/TIME | FILE INFORMATION | |
| A10 | 1/21/2016 14:00 | \\removable disk\mathematics\formulas\linear function | Equation Y = aX + b (D10) / Graph (D12) |
| A20 | 1/21/2016 15:00 | \\removable disk\mathematics\formulas\area | Area (D20) / (D22) |

DISPLAY SYSTEM, INPUT DEVICE, DISPLAY DEVICE, AND DISPLAY METHOD

BACKGROUND

1. Field

The present disclosure relates to a display system or the like that includes a control unit for controlling a display device and an input device capable of communicating with the control unit.

2. Description of the Related Art

Currently, interactive whiteboards (abbreviated as IWBs) or other types of electronic whiteboards are used in classrooms and offices. When a user (for example, a teacher in a classroom) inputs object data, such as text (characters, numbers, and so on) or graphics (graphs, tables, and so on) into an electronic whiteboard in the classroom with a pen, the object data is displayed on the electronic whiteboard. The user uses the object data displayed on the electronic whiteboard in the classroom to conduct a class for viewers around the electronic whiteboard (for example, students in the classroom).

In a case where there are two classrooms, however, the user needs to input object data of the content of the same class into electronic whiteboards respectively located in the two classrooms. For example, the user inputs object data into an electronic whiteboard (a first electronic whiteboard) in a first classroom and conducts a class using the object data displayed on the first electronic whiteboard. In a case where the user conducts the same class also in a second classroom, the user moves from the first classroom to the second classroom. In this case, the user needs to input, into an electronic whiteboard (a second electronic whiteboard) in the second classroom, object data similar to the object data input into the first electronic whiteboard.

Accordingly, it is desirable to allow the object data displayed on the first electronic whiteboard to be displayed on the second electronic whiteboard. However, in a case of saving object data displayed on an electronic whiteboard, data of the entire screen of the electronic whiteboard needs to be saved, which takes time and effort as follows.

For example, in order to display, on the second electronic whiteboard, object data displayed on the first electronic whiteboard, the user needs to save data of the entire screen of the first electronic whiteboard in a universal serial bus (USB) memory, for example, and make the data of the entire screen of the first electronic whiteboard saved in the USB memory be displayed on the second electronic whiteboard. Alternatively, the user needs to connect the first electronic whiteboard with the second electronic whiteboard via a local area network (LAN). Further, it is often the case that data that the user wants to save is not data of the entire screen of an electronic whiteboard but object data displayed on the electronic whiteboard.

Accordingly it is desirable to save the user time and effort in inputting the same content (object data) twice. For example, Japanese Patent No. 4074982 discloses an information processing apparatus in which object data displayed on a first display device is saved (stored) in a pen and the object data saved in the pen is displayed on a second display device.

The information processing apparatus described in Japanese Patent No. 4074982 includes the first and second display devices (touch panel display devices), first and second personal computers (PCs), and the pen capable of communicating with the first and second PCs. The pen includes a first switch used to give an instruction for saving object data in the pen, a second switch used to give an instruction for outputting object data from the pen, and a storage unit. First, the first PC displays a plurality of pieces of object data on the first display device. In a case where a user holds the pen so as to be in contact with one piece of object data among the plurality of pieces of object data displayed on the first display device and operates the first switch of the pen, the pen saves (stores) the one piece of object data in the storage unit of the pen, and the first PC erases the one piece of object data displayed on the first display device. Next, in a case where the user holds the pen so as to be in contact with the second display device and operates the second switch of the pen, the pen outputs the one piece of object data saved in the storage unit of the pen, and the second PC displays the one piece of object data on the second display device.

In the technique described in Japanese Patent No. 4074982, one piece of object data among the plurality of pieces of object data displayed on the first display device is saved (stored) in the pen, and the one piece of object data saved in the pen is displayed on the second display device. For example, on the first display device, pieces of object data that represent characters and expressions may be displayed or pieces of object data that represent characters and graphs may be displayed. With the technique described in Japanese Patent No. 4074982, the user can save (store) one piece of object data in the pen among the plurality of pieces of object data displayed on the first display device.

Specifically, with the technique described in Japanese Patent No. 4074982, the user needs to input object data of the content of the same class into display devices respectively located in two classrooms as in the case of electronic whiteboards. For example, the user inputs a plurality of pieces of object data into a display device (first display device) in a first classroom and conducts a class using the plurality pieces of object data displayed on the first display device. In a case where the user moves from the first classroom to a second classroom and conducts the same class in the second classroom, the user is unable to display, on a second display device, the plurality of pieces of object data displayed on the first display device if the user moves only once.

SUMMARY

In view of the issue described above, the present disclosure provides a display system or the like that allows easy input of object data by using an input device.

According to an aspect of the present disclosure, there is provided a display system including: a control unit that controls a display device; and an input device capable of communicating with the control unit. The input device includes a storage unit that stores one or more pieces of object data, and a transmission unit that transmits the one or more pieces of object data stored in the storage unit to the control unit in response to an object data request from the control unit. The control unit transmits the object data request to the input device in response to a paste operation performed by using the input device, receives the one or more pieces of object data from the input device and displays the one or more pieces of object data in a first display area of the display device as thumbnails, and displays, in a second display area of the display device, at least one piece of object data selected from among the one or more pieces of object data displayed in the first display area as thumbnails in response to a selection operation performed by using the input device.

According to an aspect of the present disclosure, there is provided a display system including: a server that controls a display device; and an input device capable of communicating with the server. The input device includes a storage unit that stores a plurality of pieces of identification information for identifying a plurality of pieces of object data respectively, and a transmission unit that transmits the plurality of pieces of identification information stored in the storage unit of the input device to the server in response to an identification information request from the server. The server includes a storage unit that stores the plurality of pieces of object data, transmits the identification information request to the input device and displays the plurality of pieces of object data respectively corresponding to the plurality of pieces of identification information from the input device in a first display area of the display device as thumbnails in response to a paste operation performed by using the input device, and displays, in a second display area of the display device, at least one piece of object data selected from among the plurality of pieces of object data displayed in the first display area as thumbnails in response to a selection operation performed by using the input device.

According to an aspect of the present disclosure, there is provided a display device capable of communicating with an input device including a storage unit that stores one or more pieces of object data. The display device includes: a transmission unit that transmits an object data request to the input device in response to a paste operation performed by using the input device; a reception unit that receives the one or more pieces of object data transmitted from the input device in response to the object data request; a thumbnail display unit that displays the received one or more pieces of object data in a first display area as thumbnails; and an object data display unit that displays, in a second display area, one or more pieces of object data selected in a selection operation performed by using the input device from among the one or more pieces of object data displayed as thumbnails.

According to an aspect of the present disclosure, there is provided a display method for a display device capable of communicating with an input device including a storage unit that stores one or more pieces of object data. The display method includes: transmitting an object data request to the input device in response to a paste operation performed by using the input device; receiving the one or more pieces of object data transmitted from the input device in response to the object data request; displaying the received one or more pieces of object data in a first display area as thumbnails; and displaying, in a second display area, one or more pieces of object data selected in a selection operation performed by using the input device from among the one or more pieces of object data displayed as thumbnails.

According to an aspect of the present disclosure, there is provided a non-transitory computer-readable storage medium storing a program executed by a computer for causing the computer to execute a function, the computer being capable of communicating with an input device including a storage unit that stores one or more pieces of object data. The function includes: transmitting an object data request to the input device in response to a paste operation performed by using the input device; receiving the one or more pieces of object data transmitted from the input device in response to the object data request; displaying the received one or more pieces of object data in a first display area as thumbnails; and displaying, in a second display area, one or more pieces of object data selected in a selection operation performed by using the input device from among the one or more pieces of object data displayed as thumbnails.

BRIEF DESCRIPTION OF THE DRAWINGS

FIG. 20 is a diagram for describing contents stored in the storage unit of the pen of the display system according to the seventh embodiment;

DESCRIPTION OF THE EMBODIMENTS

Hereinafter, embodiments of the present disclosure are described in detail with reference to the drawings. A display system according to the present disclosure is described below, for example. Note that embodiments of the present disclosure are examples for describing the present disclosure, and the present disclosure is not limited to the embodiments, as a matter of course.

1. First Embodiment

First, a first embodiment is described. In the first embodiment, a plurality of pieces of object data displayed on a display device are saved (stored) in a pen, which is an example of an input device, and a piece of object data selected from among the plurality of pieces of object data saved in the pen is displayed on a display device. Each of the plurality of pieces of object data is data that represents text (characters, numbers, and so on) or graphics (graphs, tables, and so on).

1.1 Overall Configuration

Figure 1:
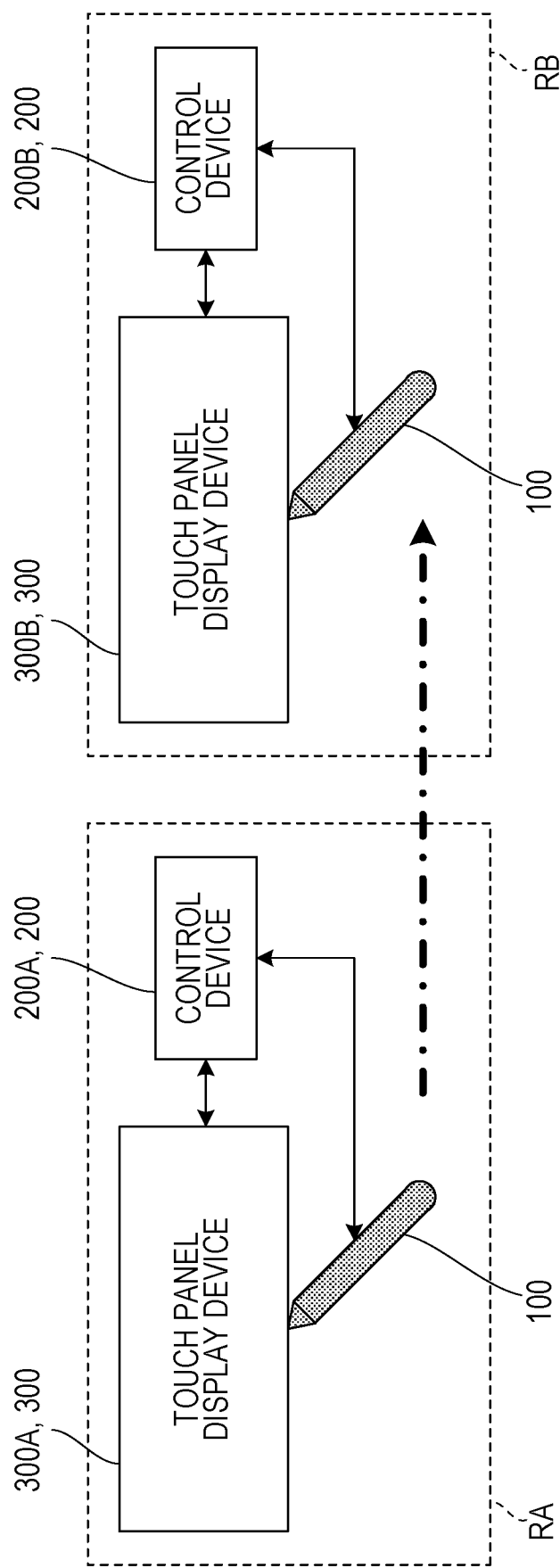
FIG. 1 is a diagram for describing an overview of a display system according to a first embodiment.

Now, the overall configuration is described with reference to FIG. 1. FIG. 1 is a diagram for describing an overview of a display system according to the first embodiment. The display system includes a pen 100, which is an input device, control devices 200, and touch panel display devices 300. The number of control devices 200 may be one or more than one, and the number of touch panel display devices 300 may be one or more than one. It is assumed hereinafter that a plurality of control devices 200 and a plurality of touch panel display devices 300 are provided.

The plurality of touch panel display devices 300 are used as electronic whiteboards or IWBs. In FIG. 1, for example, touch panel display devices 300A and 300B are respectively placed in classrooms RA and RB as the plurality of touch panel display devices 300.

The plurality of control devices 200 respectively control the plurality of touch panel display devices 300. In FIG. 1, for example, a control device 200A is connected to the touch panel display device 300A in the classroom RA, and a control device 200B is connected to the touch panel display device 300B in the classroom RB.

The pen 100 is an input device that is used as a stylus for the plurality of touch panel display devices 300. The pen 100 is used in the classroom RA or in the classroom RB. In the first embodiment, a user uses the pen 100 to perform a copy process and a paste process. Note that, in this embodiment, the above-described input device is represented by the pen; however, a similar device can be used, as a matter of course, as long as the device is capable of performing a touch operation and a drawing operation.

In the copy process, the user draws (inputs) a plurality of pieces of object data on the touch panel display device 300A in the classroom RA with the pen 100, and the control device 200A saves (stores) the plurality of pieces of object data displayed on the touch panel display device 300A in the pen 100 in response to a copy operation (described below) performed by using the pen 100.

In the paste process, the user moves from the classroom RA to the classroom RB (see the dot-dash line), the control device 200B displays a piece of object data selected from among the plurality of pieces of object data saved in the pen 100 on the touch panel display device 300B in response to a paste operation (described below) or a selection operation (described below) performed by using the pen 100.

1.2 Functional Configuration

Now, a functional configuration of each device is described with reference to the drawings.

1.2.1 Touch Panel Display Device 300

Figure 2:
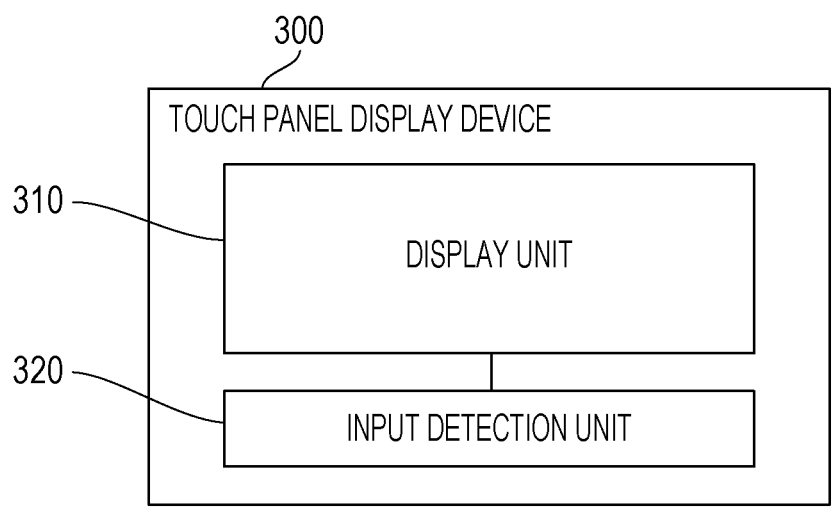
FIG. 2 is a block diagram illustrating a functional configuration of a touch panel display device of the display system according to the first embodiment.

FIG. 2 is a block diagram illustrating a functional configuration of the touch panel display device 300 of the display system according to the first embodiment. As illustrated in FIG. 2, the touch panel display device 300 includes a display unit 310 and an input detection unit 320.

The display unit 310 is a liquid crystal display (LCD). The display unit 310 is placed so as to be vertical or approximately vertical to the ground. Alternatively, the display unit 310 is placed so as to be horizontal or approximately horizontal to the ground like a table is placed.

The input detection unit 320 is a touch panel. For example, the input detection unit 320 includes capacitive sensors that are arranged in a matrix on the display unit 310 so as to form a coordinate plane. Each of the capacitive sensors can detect user input into the display unit 310 when the user performs an input operation on the display unit 310 by using an instruction medium (the pen 100 or the user's finger).

Note that the touch panel display device, for example, is described herein; however, a similar device or system may be used as long as the device or system is a display system capable of detecting and displaying user input. For example, the touch panel display device may be implemented by combining a device that performs projection onto a table or a wall (for example, a projector) and a device that detects input.

1.2.2 Control Device 200

Figure 3:
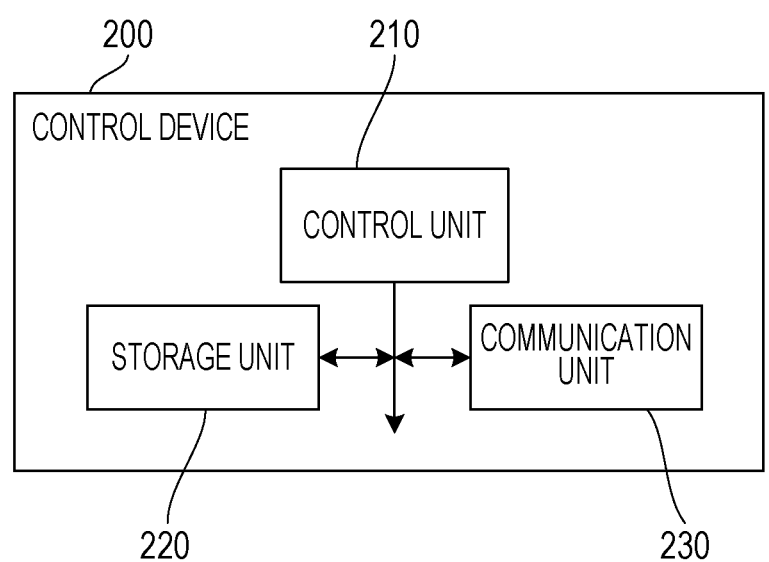
FIG. 3 is a block diagram illustrating a functional configuration of a control device of the display system according to the first embodiment.

FIG. 3 is a block diagram illustrating a functional configuration of the control device 200 of the display system according to the first embodiment. As illustrated in FIG. 3, the control device 200 includes a control unit 210, a storage unit 220, and a communication unit 230.

The control unit 210 is a functional unit for controlling the control device 200 on the whole. The control unit 210 reads and executes various programs stored in the storage unit 220 to thereby implement various functions and is constituted by a central processing unit (CPU) and so on, for example.

The storage unit 220 is a functional unit in which various programs and various types of data used in operations of the control device 200 are stored. The storage unit 220 is constituted by a semiconductor memory or a hard disk drive (HDD), for example.

The communication unit 230 is a functional unit for the control device 200 to communicate with the pen 100. The communication method of the communication unit 230 is implemented by using a network interface card (NIC) used in a wired or wireless LAN or a communication module capable of making a connection with a 3G/LTE line. As the communication method of the communication unit 230, Bluetooth (registered trademark) or a near-field wireless communication, such as ZigBee, may be used.

1.2.3 Pen 100

Figure 4:
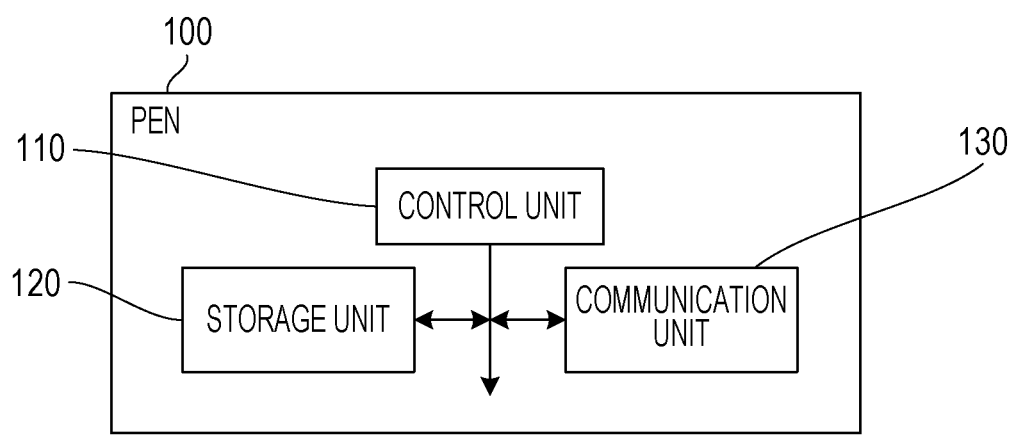
FIG. 4 is a block diagram illustrating a functional configuration of a pen of the display system according to the first embodiment.

FIG. 4 is a block diagram illustrating a functional configuration of the pen 100 of the display system according to the first embodiment. As illustrated in FIG. 4, the pen 100 includes a control unit 110 (pen control unit), a storage unit 120, and a communication unit 130.

The control unit 110 is a functional unit for controlling the pen 100 on the whole. The control unit 110 reads and executes various programs stored in the storage unit 120 to thereby implement various functions and is constituted by a CPU and so on, for example.

The storage unit 120 is a functional unit in which various programs and various types of data used in operations of the pen 100 are stored. The storage unit 120 is constituted by a semiconductor memory, for example. Note that the storage unit 120 may be implemented by, for example, attaching an external storage device (for example, a microSD card or a USB memory) to the pen 100. Alternatively, a storage device connected via a network may be used as the storage unit 120. For example, a terminal device, such as a smartphone, may be connected to the pen 100 through near-field wireless communication to thereby implement the storage unit 120.

The communication unit 130 is a functional unit for the pen 100 to communicate with the control device 200. The communication method of the communication unit 130 is the same as the communication method of the communication unit 230 of the control device 200. The communication unit 130 may communicate with the touch panel display device 300.

1.3 Process Flows

Now, process flows in this embodiment are described with reference to the drawings.

1.3.1 Copy Process

Figure 5:
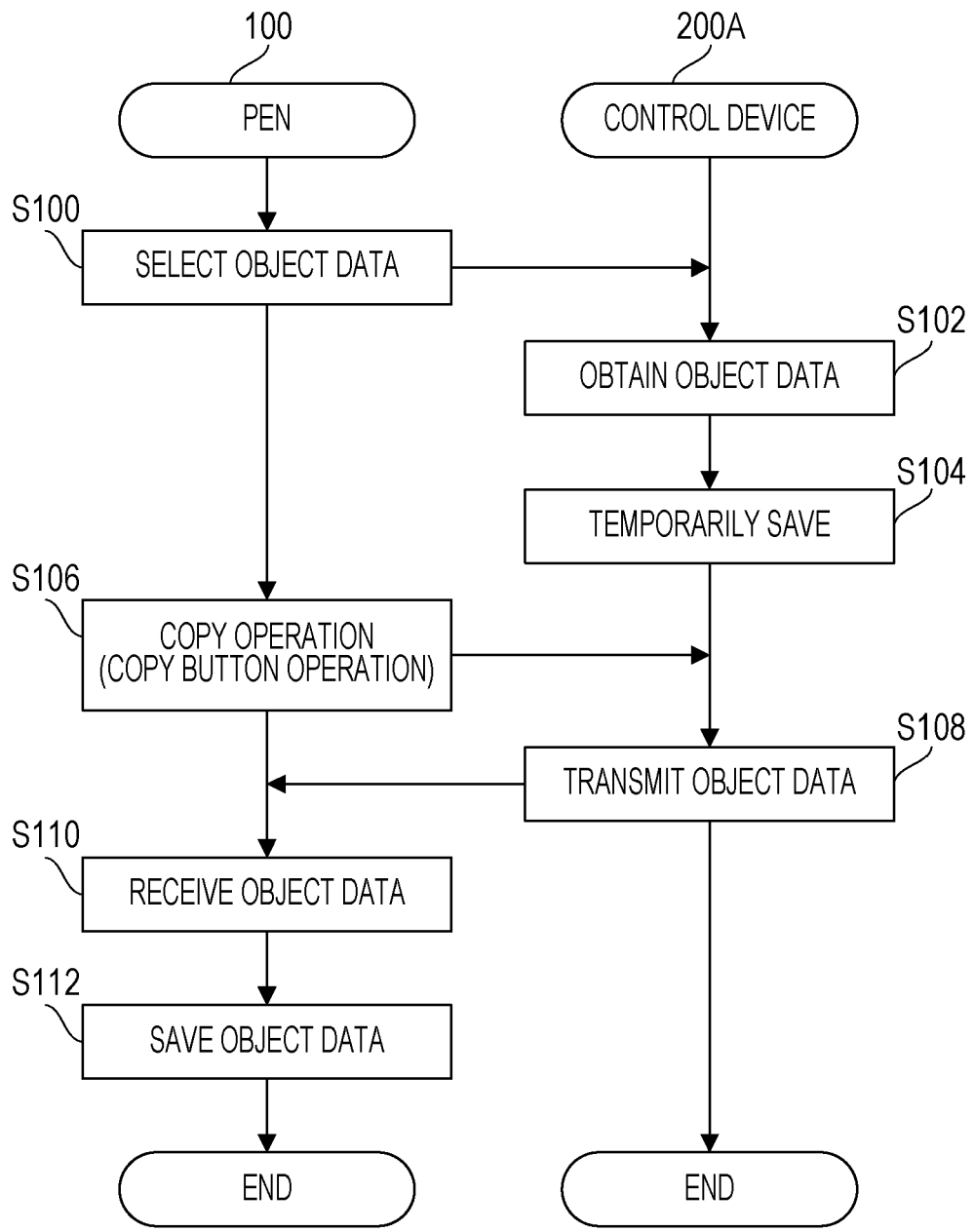
FIG. 5 is a flowchart illustrating a copy process as an operation of the display system according to the first embodiment.

FIG. 5 is a flowchart illustrating the copy process as an operation of the display system according to the first embodiment. The user performs the copy process by using the pen 100 in the classroom RA.

First, the user draws (inputs) a plurality of pieces of object data on the touch panel display device 300A. Next, the user performs a first selection operation using the pen 100. The first selection operation performed by using the pen 100 is an operation of drawing a curved line with the pen 100 so as to encircle at least one piece of object data displayed on the touch panel display device 300A (step S100).

At this time, the control unit 210 of the control device 200A obtains the at least one piece of object data displayed on the touch panel display device 300A in response to the first selection operation performed by using the pen 100 (step S102). The control unit 210 of the control device 200A temporarily saves the at least one piece of object data in the storage unit 220 (step S104).

Next, the user performs a copy operation using the pen 100 (step S106). The copy operation is performed by operating a copy button, which is described below, displayed on the touch panel display device 300A (see FIGS. 8 and 9).

At this time, the control unit 210 of the control device 200A transmits the at least one piece of object data to the pen 100 via the communication unit 230 in response to the copy operation performed by using the pen 100 (step S108).

The control unit 110 of the pen 100 receives the at least one piece of object data from the control device 200A via the communication unit 130 (step S110) and saves (stores) the at least one piece of object data in the storage unit 120 as part of a plurality of pieces of object data (step S112).

1.3.2 Paste Process

Figure 6:
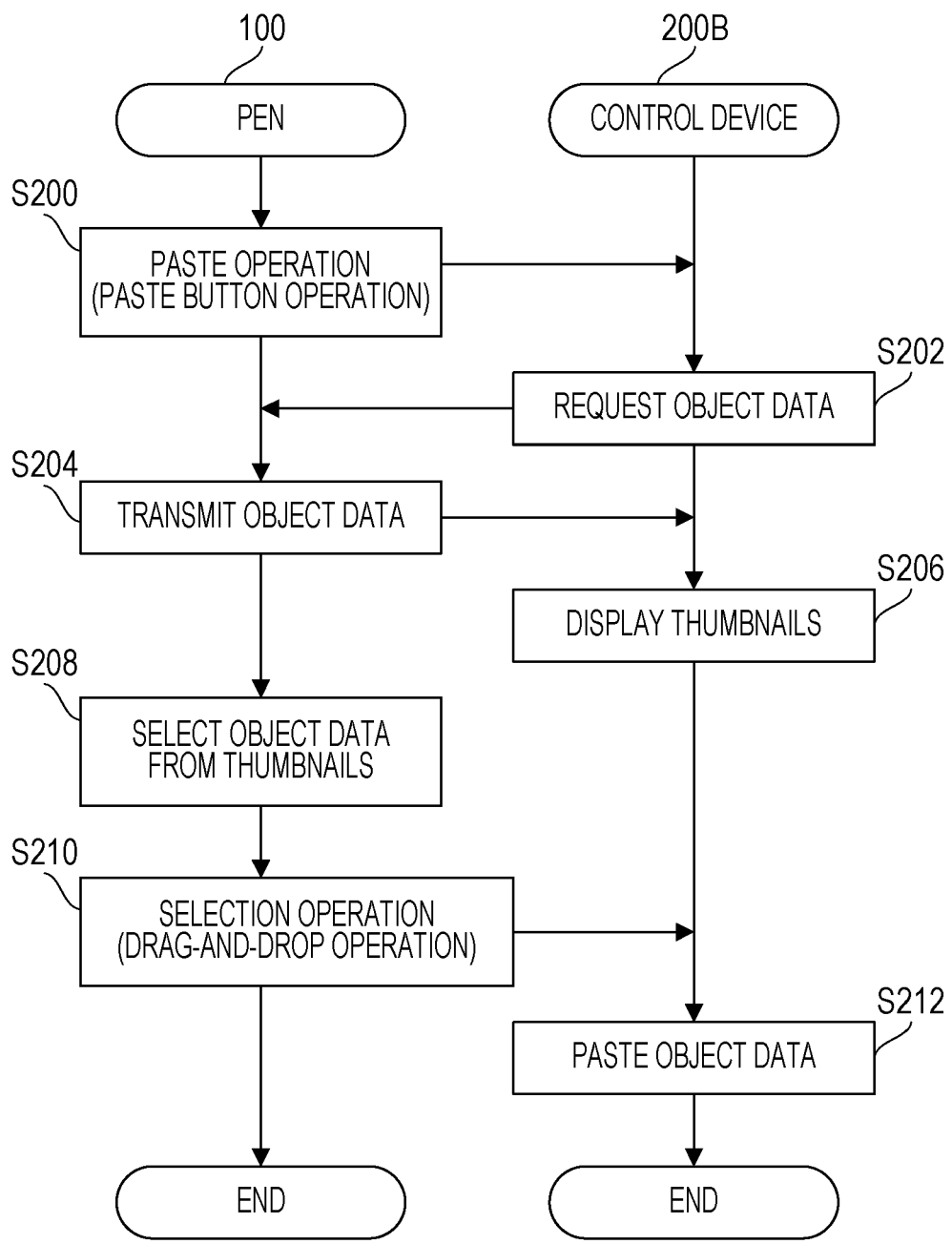
FIG. 6 is a flowchart illustrating a paste process as an operation of the display system according to the first embodiment.

FIG. 6 is a flowchart illustrating the paste process as an operation of the display system according to the first embodiment. The user moves from the classroom RA to the classroom RB, and thereafter, performs the paste process by using the pen 100 in the classroom RB.

First, the user performs a paste operation using the pen 100 (step S200). The paste operation is performed by operating a paste button, which is described below, displayed on the touch panel display device 300B (see FIG. 10).

At this time, the control unit 210 of the control device 200B transmits an object data request to the pen 100 in response to the paste operation performed by using the pen 100 (step S202).

The control unit 110 of the pen 100 transmits the plurality of pieces of object data stored in the storage unit 120 to the control device 200B via the communication unit 130 in response to the object data request from the control device 200B (step S204).

At this time, the control unit 210 of the control device 200B displays the plurality of pieces of object data from the pen 100 in a first display area of the touch panel display device 300B as thumbnails (step S206).

Then, the user selects a desired piece of object data from among the plurality of pieces of object data displayed in the first display area of the touch panel display device 300B as thumbnails by using the pen 100 (step S208). Subsequently, the user performs a second selection operation using the pen 100. The second selection operation performed by using the pen 100 is a drag-and-drop operation for moving the selected piece of object data from the first display area (see the display area W10 in FIG. 10) of the touch panel display device 300B to a second display area (see the display area W20 in FIG. 12) of the touch panel display device 300B and placing the piece of object data in the second display area (step S210).

At this time, the control unit 210 of the control device 200B displays, in the second display area of the touch panel display device 300B, the piece of object data selected from among the plurality of pieces of object data displayed in the first display area of the touch panel display device 300B as thumbnails in response to the second selection operation performed by using the pen 100. That is, the selected piece of object data displayed in the first display area of the touch panel display device 300B is pasted into the second display area of the touch panel display device 300B (step S212).

1.4 Example Operations

Now, specific example operations (example screens) are described with reference to FIGS. 7 to 12. FIGS. 7 to 12 each illustrate an example display screen displayed on the touch panel display device 300 as an operation of the display system according to the first embodiment. In a display area W2 of the touch panel display devices 300 (the touch panel display devices 300A and 300B), a copy button 330 used to perform a copy operation and a paste button 332 used to perform a paste operation are displayed.

Here, the copy button 330 is displayed in accordance with a gesture operation that represents a copy operation in a copy process described below, and the paste button 332 is displayed in accordance with a gesture operation that represents a paste operation in a paste process described below. For example, it is assumed that the gesture operation that represents a copy operation is an operation of the user holding the pen 100 so as to be in contact with the touch panel display device 300A for a first set time (for example, 2 seconds). Further, it is assumed that the gesture operation that represents a paste operation is an operation of the user double-clicking on the touch panel display device 300B with the pen 100 within a second set time (for example, 0.5 seconds).

Alternatively, the pen 100 is provided with a first button and a second button. The copy button 330 is displayed in accordance with an operation of the first button of the pen 100 in the copy process described below, and the paste button 332 is displayed in accordance with an operation of the second button of the pen 100 in the paste process described below.

1.4.1 Copy Process

Figure 7:
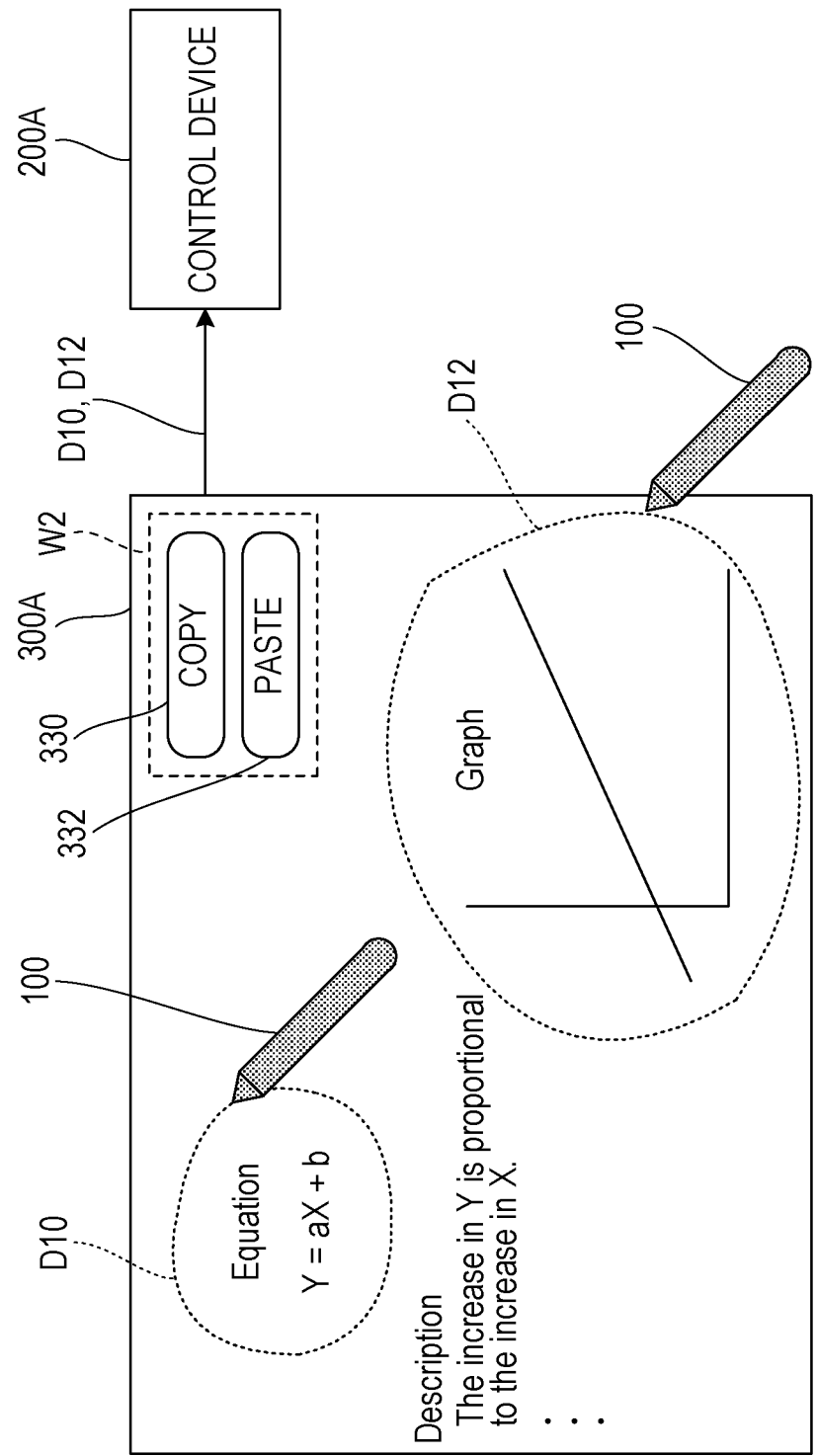
FIG. 7 illustrates an example display screen displayed on the touch panel display device as an operation of the display system according to the first embodiment.
Figure 8:
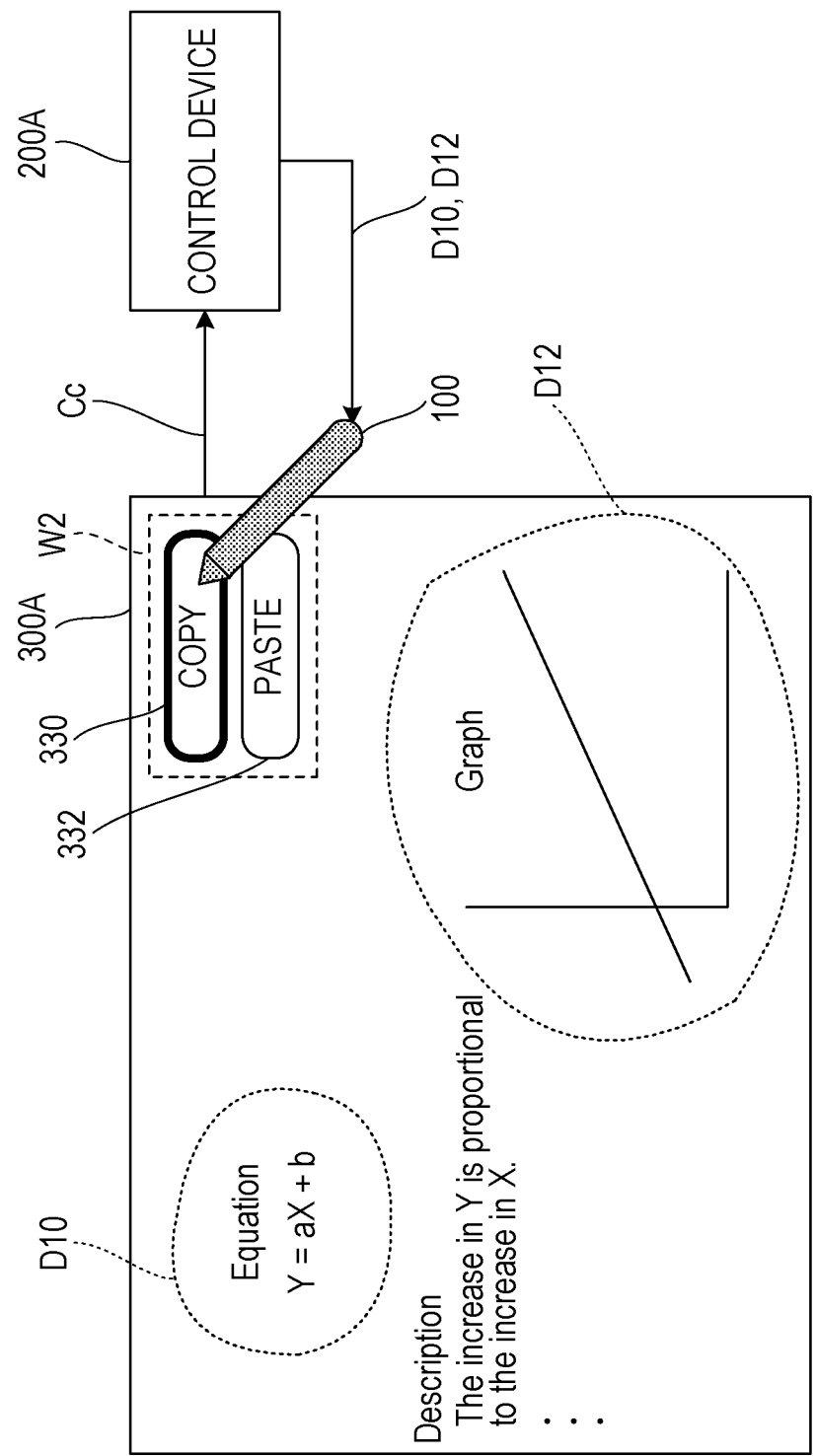
FIG. 8 illustrates an example display screen displayed on the touch panel display device as an operation of the display system according to the first embodiment.
Figure 9:
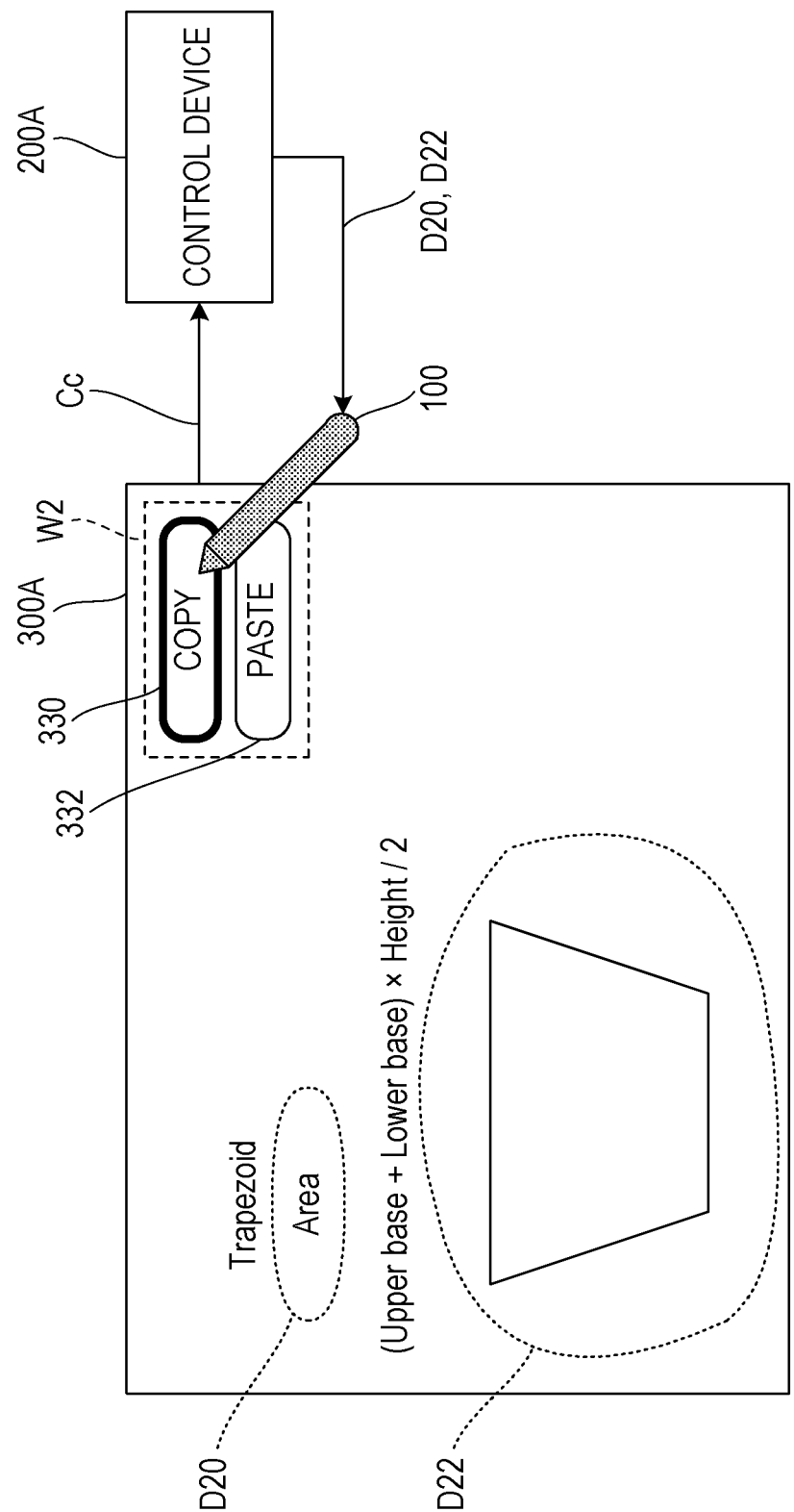
FIG. 9 illustrates an example display screen displayed on the touch panel display device as an operation of the display system according to the first embodiment.

First, the copy process is described with reference to FIGS. 7 to 9. FIGS. 7 to 9 are diagrams for describing the copy process as an operation of the display system according to the first embodiment.

As illustrated in FIG. 7, a plurality of pieces of object data drawn (input) by the user using the pen 100 are displayed on the touch panel display device 300A.

As illustrated in FIG. 7, the user draws curved lines with the pen 100 so as to encircle the piece of object data D10 and the piece of object data D12 among the plurality of pieces of object data displayed on the touch panel display device 300A as a first selection operation using the pen 100. The piece of object data D10 represents text, namely, the characters "Equation" and the expression "Y=aX+b". The piece of object data D12 represents text, namely, the characters "Graph", and graphics, namely, the graph of "Y=aX+b".

At this time, the control unit 210 of the control device 200A obtains the pieces of object data D10 and D12 displayed on the touch panel display device 300A in response to the first selection operation performed by using the pen 100. Specifically, the control unit 210 of the control device 200A obtains coordinate data that represents the pieces of object data D10 and D12 displayed on the touch panel display device 300A in response to the first selection operation to thereby identify the pieces of object data D10 and D12. The coordinate data that represents the pieces of object data D10 and D12 indicates the positions of corresponding capacitive sensors when the input detection unit 320 detects the first selection operation among the capacitive sensors arranged in a matrix on the display unit 310 in the touch panel display device 300A. The control unit 210 of the control device 200A temporarily saves the pieces of object data D10 and D12 in the storage unit 220.

As illustrated in FIG. 8, the user operates the copy button 330 displayed in the display area W2 of the touch panel display device 300A as a copy operation using the pen 100. The control unit 210 of the control device 200A recognizes the copy operation (copy command Cc) performed by using the pen 100. Specifically, the control unit 210 of the control device 200A obtains coordinate data that represents the copy button 330 displayed in the display area W2 of the touch panel display device 300A to thereby recognize the operation of the copy button 330 (copy command Cc). The coordinate data that represents the copy button 330 indicates the positions of corresponding capacitive sensors when the input detection unit 320 detects the operation of the copy button 330 among the capacitive sensors arranged in a matrix on the display unit 310 in the touch panel display device 300A. At this time, the control unit 210 of the control device 200A transmits the pieces of object data D10 and D12 to the pen 100 via the communication unit 230 in response to the copy operation performed by using the pen 100. The control unit 110 of the pen 100 receives the pieces of object data D10 and D12 from the control device 200A via the communication unit 130 and saves (stores) the pieces of object data D10 and D12 in the storage unit 120.

Similarly, as illustrated in FIG. 9, the user draws curved lines with the pen 100 so as to encircle the piece of object data D20 and the piece of object data D22 among the plurality of pieces of object data displayed on the touch panel display device 300A as a first selection operation using the pen 100, and operates the copy button 330 displayed in the display area W2 of the touch panel display device 300A as a copy operation using the pen 100. The piece of object data D20 represents text, namely, the characters "Area", and the piece of object data D22 represents graphics, namely, a trapezoid. In this case, the control unit 210 of the control device 200A temporarily saves the pieces of object data D20 and D22 displayed on the touch panel display device 300A in the storage unit 220 in response to the first selection operation performed by using the pen 100, and transmits the pieces of object data D20 and D22 to the pen 100 via the communication unit 230 in response to the copy operation (copy command Cc) performed by using the pen 100. The control unit 110 of the pen 100 receives the pieces of object data D20 and D22 from the control device 200A via the communication unit 130 and saves (stores) the pieces of object data D20 and D22 in the storage unit 120.

1.4.2 Paste Process

Figure 10:
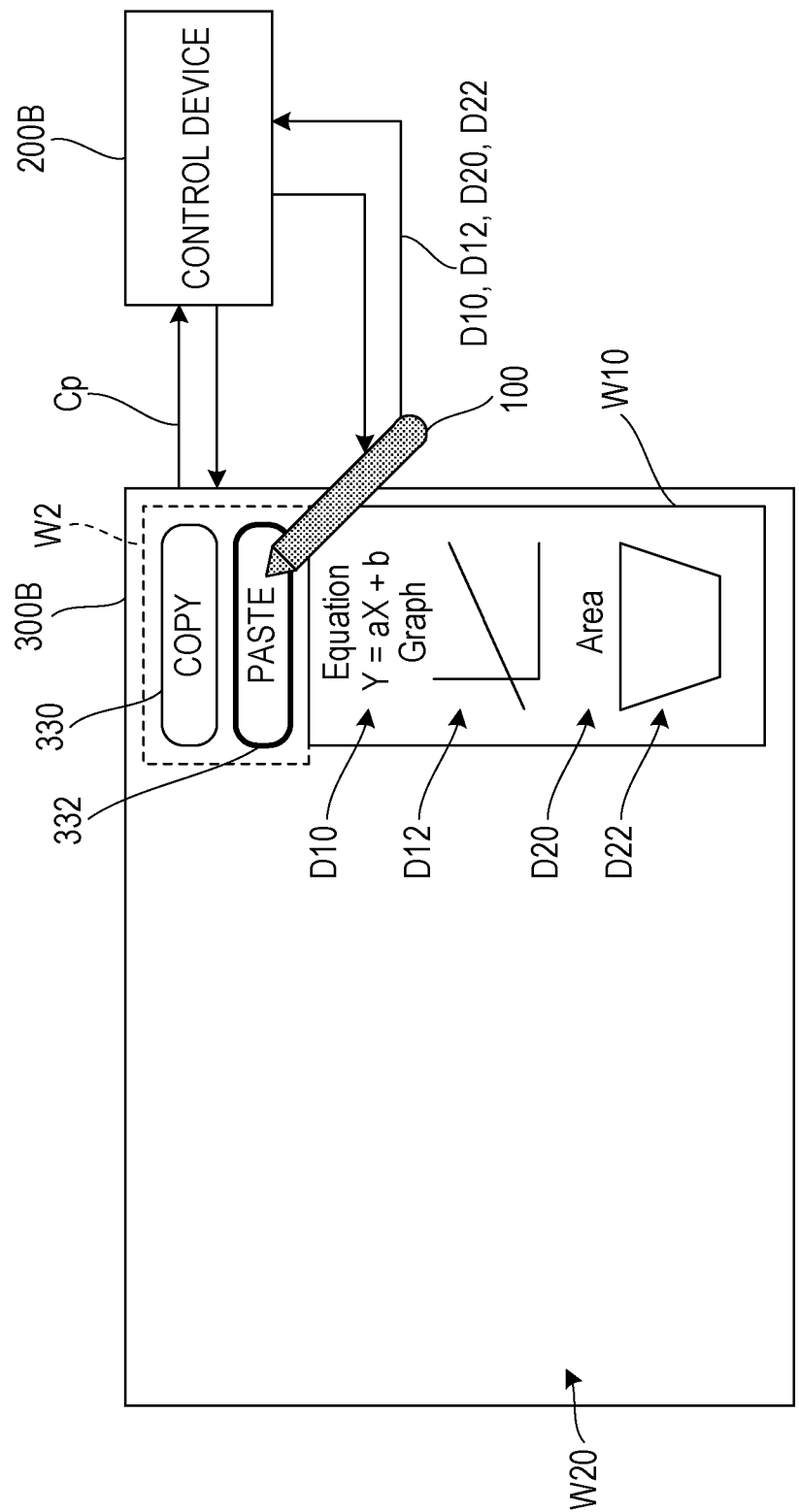
FIG. 10 illustrates an example display screen displayed on the touch panel display device as an operation of the display system according to the first embodiment.
Figure 11:
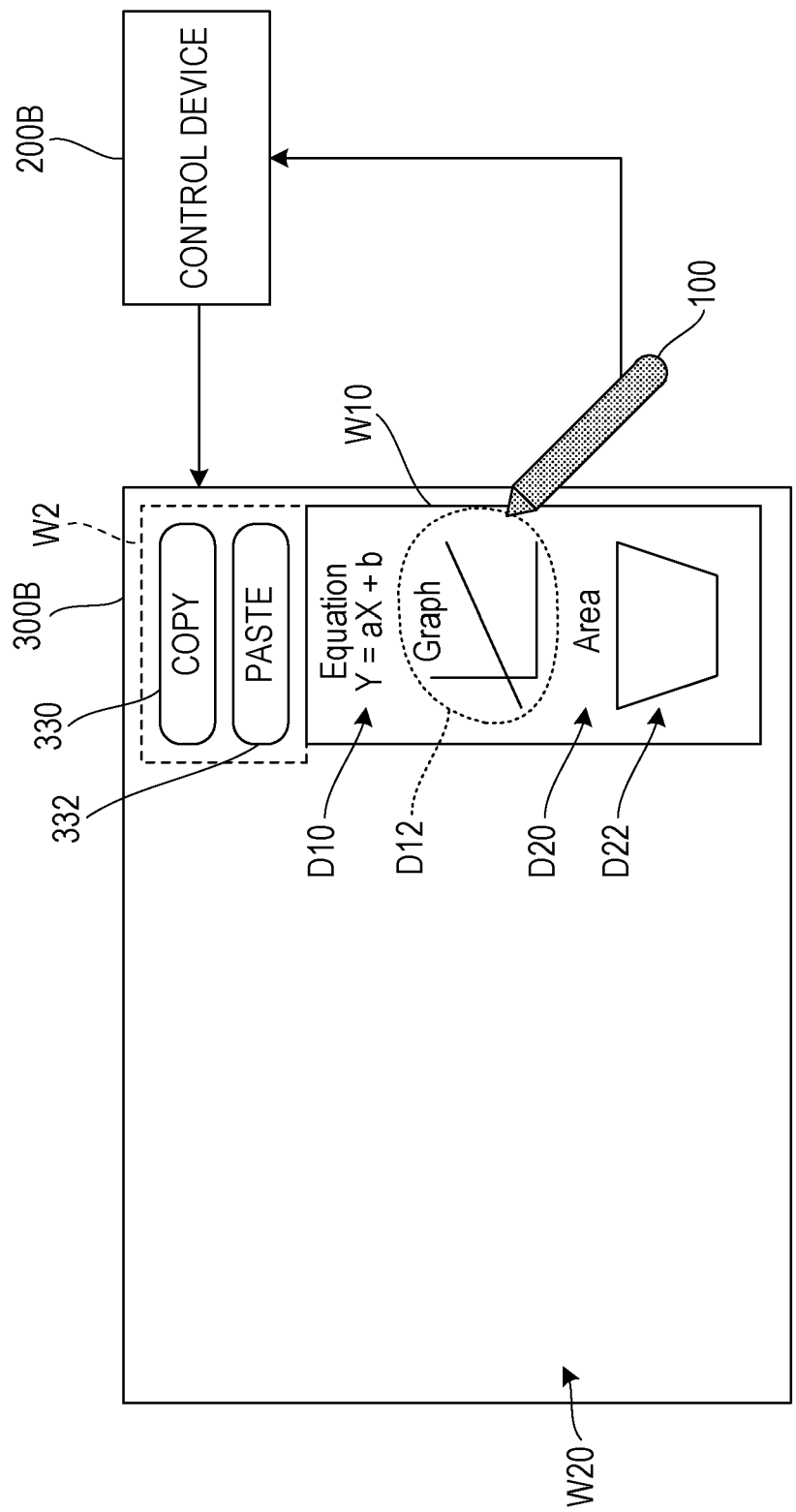
FIG. 11 illustrates an example display screen displayed on the touch panel display device as an operation of the display system according to the first embodiment.
Figure 12:
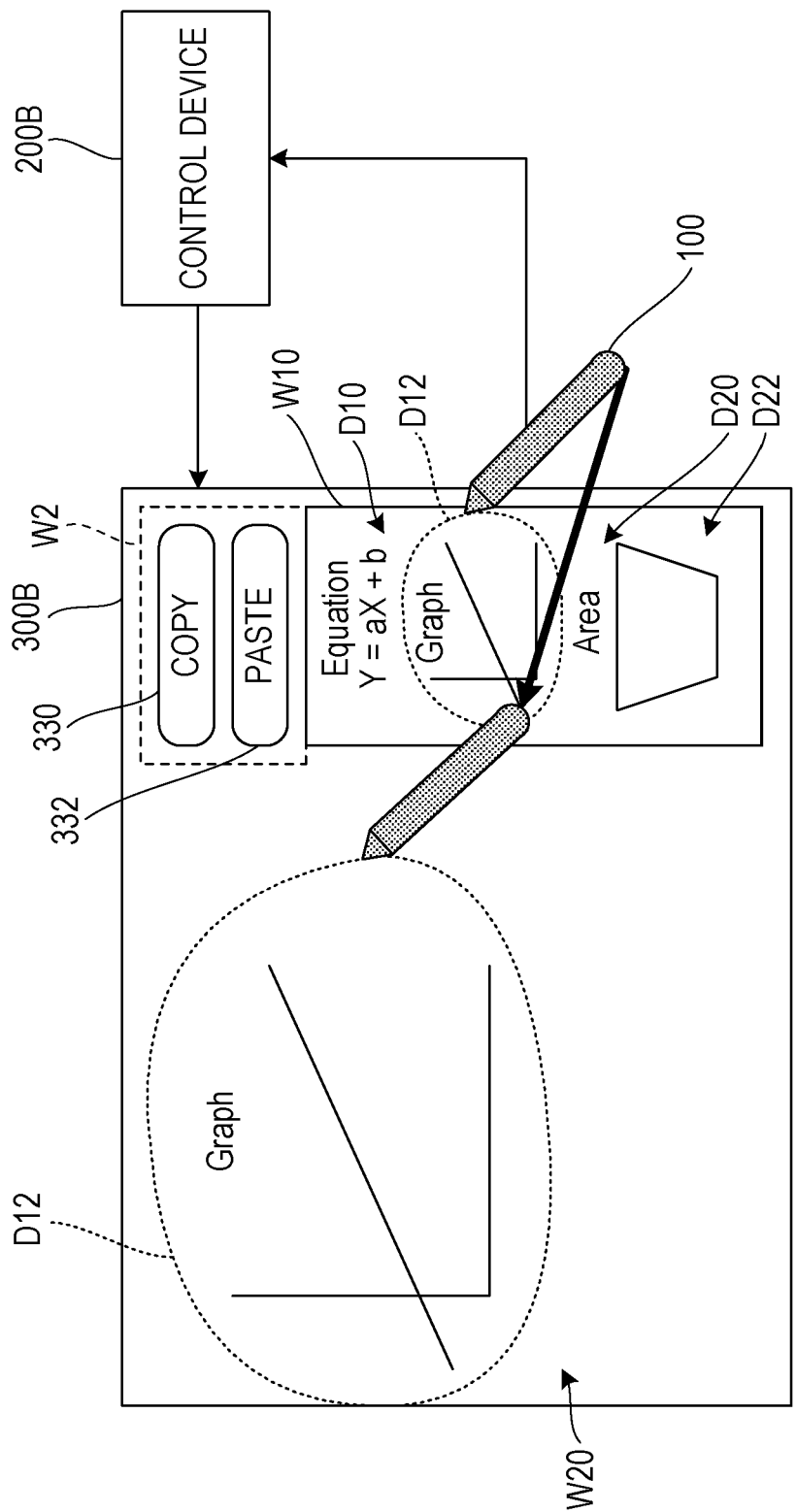
FIG. 12 illustrates an example display screen displayed on the touch panel display device as an operation of the display system according to the first embodiment.

Next, the paste process is described with reference to FIGS. 10 to 12. FIGS. 10 to 12 are diagrams for describing the paste process as an operation of the display system according to the first embodiment. In the storage unit 120 of the pen 100, the pieces of object data D10, D12, D20, and D22 are saved as a plurality of pieces of object data.

As illustrated in FIG. 10, the user operates the paste button 332 displayed in the display area W2 of the touch panel display device 300B as a paste operation using the pen 100. The control unit 210 of the control device 200B recognizes the paste operation (paste command Cp) performed by using the pen 100. Specifically, the control unit 210 of the control device 200B obtains coordinate data that represents the paste button 332 displayed in the display area W2 of the touch panel display device 300B to thereby recognize the operation of the paste button 332 (paste command Cp). The coordinate data that represents the paste button 332 indicates the positions of corresponding capacitive sensors when the input detection unit 320 detects the operation of the paste button 332 among the capacitive sensors arranged in a matrix on the display unit 310 in the touch panel display device 300B. At this time, the control unit 210 of the control device 200B transmits an object data request to the pen 100 in response to the paste operation performed by using the pen 100.

As illustrated in FIG. 10, the control unit 110 of the pen 100 transmits the plurality of pieces of object data D10, D12, D20, and D22 stored in the storage unit 120 to the control device 200B via the communication unit 130 in response to the object data request from the control device 200B. At this time, the control unit 210 of the control device 200B displays the plurality of pieces of object data D10, D12, D20, and D22 from the pen 100 in the first display area (the display area W10) of the touch panel display device 300B as thumbnails. In this case, each of the plurality of pieces of object data D10, D12, D20, and D22 is reduced by changing the size based on the coordinate data thereof to a size for thumbnail display and displayed in the display area W10 of the touch panel display device 300B.

As illustrated in FIG. 11, the user selects the piece of object data D12, which is a desired one, from among the plurality of pieces of object data D10, D12, D20, and D22 displayed in the display area W10 of the touch panel display device 300B as thumbnails by using the pen 100.

As illustrated in FIG. 12, the user performs a drag-and-drop operation for moving the selected piece of object data D12 from the display area W10 of the touch panel display device 300B to the second display area (the display area W20) of the touch panel display device 300B and placing the piece of object data D12 in the display area W20 as a second selection operation using the pen 100. At this time, the control unit 210 of the control device 200B displays the piece of object data D12 selected from among the plurality of pieces of object data displayed in the display area W10 of the touch panel display device 300B as thumbnails in the display area W20 of the touch panel display device 300B in response to the second selection operation performed by using the pen 100. Here, when the selected piece of object data D12 in the display area W10 of the touch panel display device 300B is moved or copied to the display area W20 of the touch panel display device 300B, the piece of object data D12 is enlarged by changing the size, which is the size for thumbnail display, to the size based on the coordinate data thereof and displayed in the display area W20 of the touch panel display device 300B.

As described above, the display system according to the first embodiment includes the control units (the control unit 210 of the control device 200A and the control unit 210 of the control device 200B) that control the display devices (the touch panel display devices 300A and 300B), and the pen 100 capable of communicating with the control devices 200A and 200B. The control unit 210 of the control device 200A obtains at least one piece of object data (the piece of object data D10, D12, D20, or D22) displayed on the touch panel display device 300A in response to a first selection operation and transmits the obtained piece of object data, namely, the piece of object data D10, D12, D20, or D22, to the pen 100 in response to a copy operation performed by using the pen 100. The pen 100 includes the storage unit 120 and the pen control unit (the control unit 110) that stores the pieces of object data D10, D12, D20, and D22 from the control unit 210 of the control device 200A in the storage unit 120 as a plurality of pieces of object data. The control unit 110 of the pen 100 transmits the plurality of pieces of object data D10, D12, D20, and D22 stored in the storage unit 120 to the control unit 210 of the control device 200B in response to an object data request from the control unit 210 of the control device 200B. The control unit 210 of the control device 200B transmits an object data request to the pen 100 in response to a paste operation performed by using the pen 100 and displays the plurality of pieces of object data D10, D12, D20, and D22 from the pen 100 in the first display area (the display area W10) of the touch panel display device 300B as thumbnails. The control unit 210 of the control device 200B displays the piece of object data D12 selected from among the plurality of pieces of object data D10, D12, D20, and D22 displayed in the display area W10 of the touch panel display device 300B as thumbnails in the second display area (the display area W20) of the touch panel display device 300B in response to a second selection operation performed by using the pen 100. Accordingly, in the display system according to the first embodiment, the plurality of pieces of object data D10, D12, D20, and D22 displayed on the touch panel display device 300A are saved (stored) in the pen 100, and the plurality of pieces of object data D10, D12, D20, and D22 saved in the pen 100 are selectively displayed on the touch panel display device 300B. Therefore, it is possible to save the user time and effort in inputting the plurality of pieces of object data D10, D12, D20, and D22 twice.

Further, in the display system according to the first embodiment, the copy button 330 used to perform the copy operation and the paste button 332 used to perform the paste operation are displayed in the display area W2 of the touch panel display devices 300A and 300B. The copy operation and the paste operation respectively correspond to an operation of the copy button 330 and an operation of the paste button 332. The first selection operation is an operation of drawing a curved line with the pen 100 so as to encircle any of the pieces of object data D10, D12, D20, and D22 displayed on the touch panel display device 300A. The second selection operation is a drag-and-drop operation for moving the selected piece of object data D12 from the display area W10 of the touch panel display device 300B to the display area W20 of the touch panel display device 300B and placing the piece of object data D12 in the display area W20. Accordingly, in the display system according to the first embodiment, the first selection operation, the copy operation, the paste operation, and the second selection operation can be performed as simple operations.

As a consequence, according to this embodiment, the operation buttons are displayed on the display, and the user selects any of the displayed operation buttons for performing the copy or paste process. With such operations on the touch panel, which are easy and do not give the user uneasy feeling, processing can be performed.

2. Second Embodiment

Now, a second embodiment is described. In the second embodiment, a plurality of pieces of object data are saved (stored) in advance in the pen 100, and a piece of object data selected from among the plurality of pieces of object data saved in the pen 100 is displayed on the display device. Processes in the second embodiment that are the same as those in the first embodiment are assigned the same reference numerals as those in the first embodiment, and detailed descriptions thereof are omitted.

Figure 13:
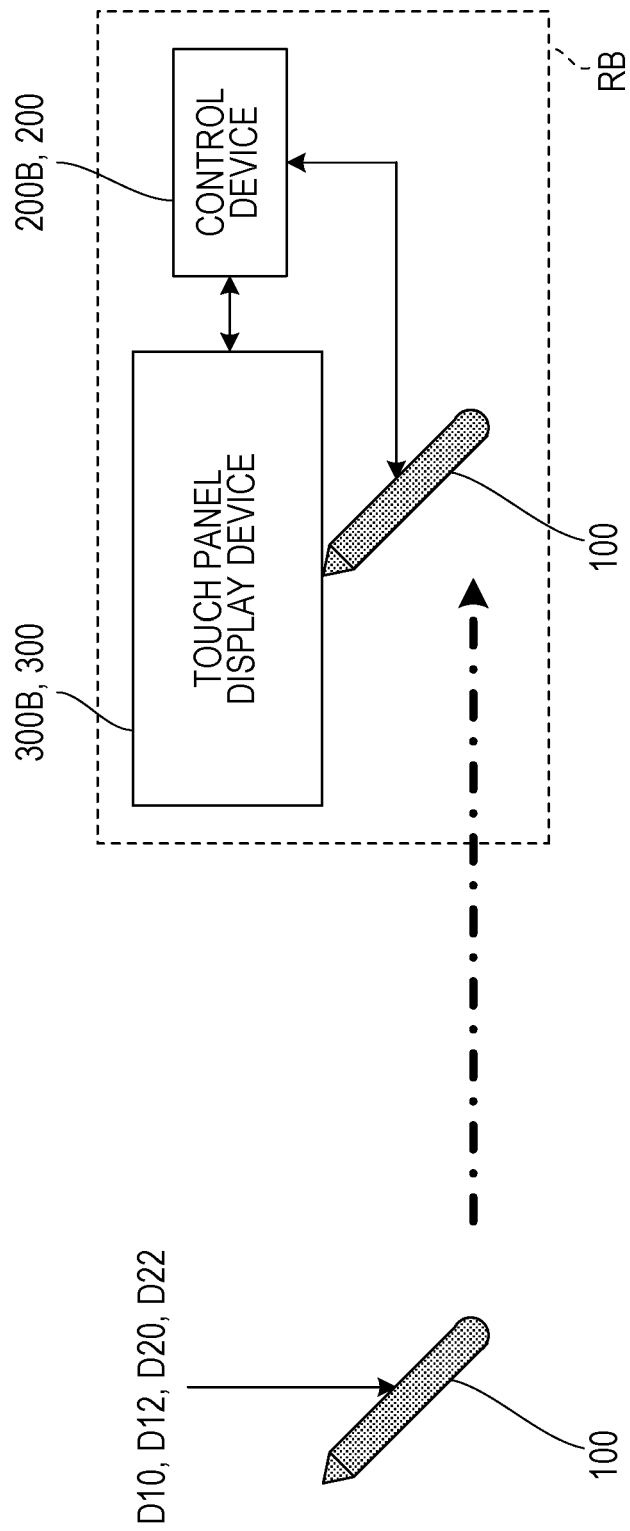
FIG. 13 is a diagram for describing an overview of the display system according to a second embodiment.

FIG. 13 is a diagram for describing an overview of the display system according to the second embodiment. In the second embodiment, the copy process in the first embodiment is not performed, and only a download process and the paste process in the first embodiment are performed.

In the download process, the user downloads in advance the plurality of pieces of object data D10, D12, D20, and D22 to the pen 100. Alternatively, the pen 100 is shipped in a state where the plurality of pieces of object data D10, D12, D20, and D22 have been downloaded in advance to the pen 100.

In the paste process, the user moves to the classroom RB (see the dot-dash line), and the control device 200B displays a piece of object data selected from among the plurality of pieces of object data D10, D12, D20, and D22 saved in the pen 100 on the touch panel display device 300B in response to a paste operation and a selection operation performed by using the pen 100.

As described above, the display system according to the second embodiment includes the control unit (the control unit 210 of the control device 200B) that controls the display device (the touch panel display device 300B), and the pen 100 capable of communicating with the control unit (the control unit 210 of the control device 200B). The pen 100 includes the storage unit 120 that stores the plurality of pieces of object data D10, D12, D20, and D22 and the pen control unit (the control unit 110) that transmits the plurality of pieces of object data D10, D12, D20, and D22 stored in the storage unit 120 to the control unit 210 of the control device 200B in response to an object data request from the control unit 210 of the control device 200B. The control unit 210 of the control device 200B transmits an object data request to the pen 100 in response to a paste operation performed by using the pen 100 and displays the plurality of pieces of object data D10, D12, D20, and D22 from the pen 100 in the first display area (the display area W10) of the touch panel display device 300B as thumbnails. The control unit 210 of the control device 200B displays the piece of object data D12 selected from among the plurality of pieces of object data D10, D12, D20, and D22 displayed in the display area W10 of the touch panel display device 300B as thumbnails in the second display area (the display area W20) of the touch panel display device 300B in response to a selection operation (the second selection operation in the first embodiment) performed by using the pen 100. Accordingly, in the display system according to the second embodiment, the plurality of pieces of object data D10, D12, D20, and D22 are saved (stored) in the pen 100, and the plurality of pieces of object data D10, D12, D20, and D22 saved in the pen 100 are selectively displayed on the touch panel display device 300B. Therefore, it is possible to save the user time and effort in inputting the plurality of pieces of object data D10, D12, D20, and D22 twice.

Further, in the display system according to the second embodiment, the paste button 332 used to perform the paste operation is displayed in the display area W2 of the touch panel display device 300B. The paste operation corresponds to an operation of the paste button 332. The selection operation (the second selection operation in the first embodiment) is a drag-and-drop operation for moving the selected piece of object data D12 from the display area W10 of the touch panel display device 300B to the display area W20 of the touch panel display device 300B and placing the piece of object data D12 in the display area W20. Accordingly, in the display system according to the second embodiment, the paste operation and the selection operation can be performed as simple operations.

3. Third Embodiment

Now, a third embodiment is described. The third embodiment has the same functions and configurations as those of the first embodiment; however, the copy process in the first embodiment illustrated in FIG. 5 is replaced by a copy process illustrated in FIG. 14, and the paste process in the first embodiment illustrated in FIG. 6 is replaced by a paste process illustrated in FIG. 15. In this embodiment, these processes are focused and described. Note that processes in this embodiment that are the same as those in the first embodiment are assigned the same reference numerals as those in the first embodiment, and detailed descriptions thereof are omitted.

3.1 Copy Process

Figure 14:
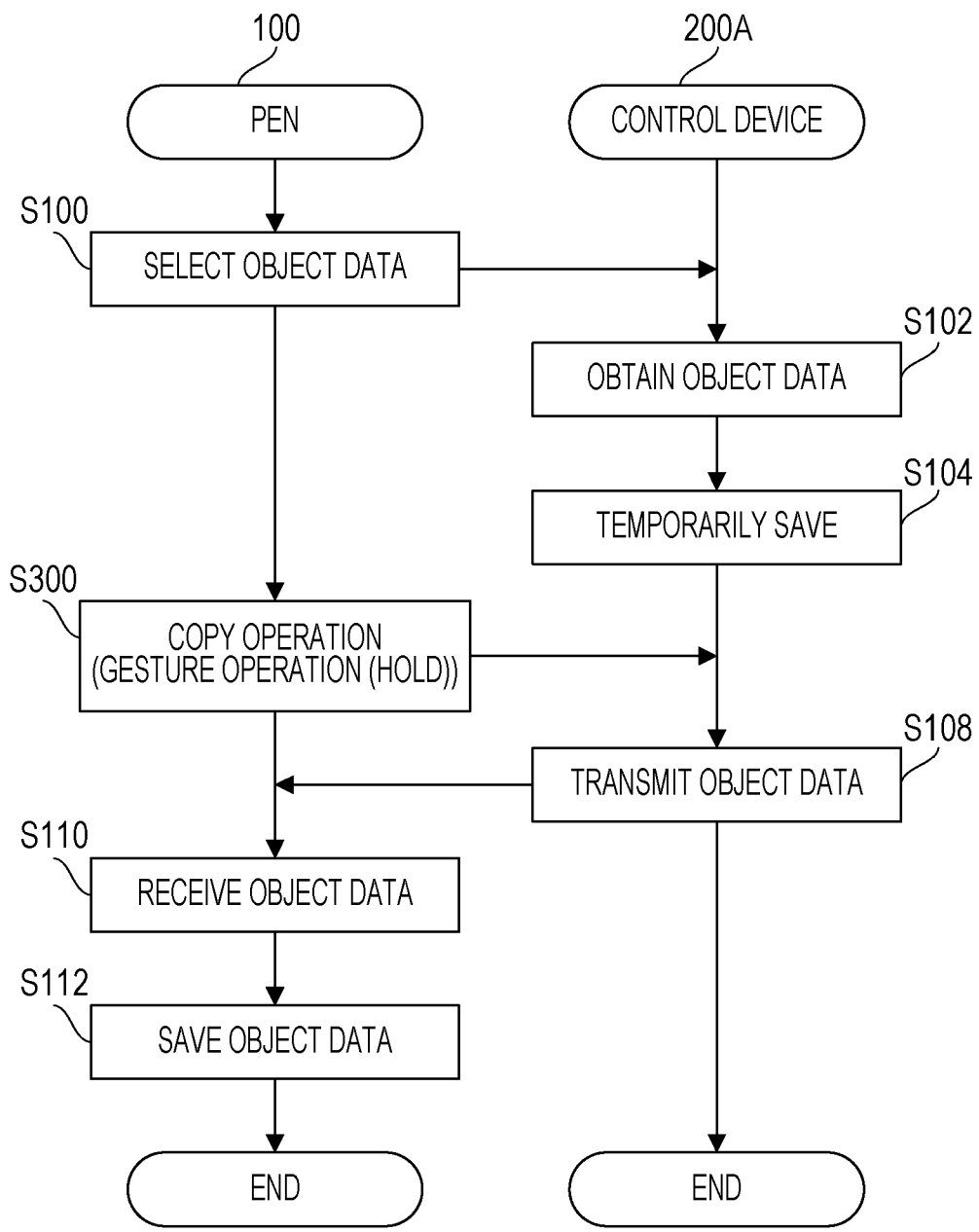
FIG. 14 is a flowchart illustrating a copy process as an operation of the display system according to a third embodiment.

FIG. 14 is a flowchart illustrating the copy process as an operation of the display system according to the third embodiment.

First, steps S100, S102, and S104 in the first embodiment are performed. Next, the user performs a copy operation using the pen 100 (step S300). The copy operation is performed as a gesture operation performed on the touch panel display device 300A. For example, it is assumed that the gesture operation that represents the copy operation is an operation of the user holding the pen 100 so as to be in contact with the touch panel display device 300A for a first set time (for example, 2 seconds). Then, step S108 and the subsequent steps in the first embodiment are performed.

3.2 Paste Process

Figure 15:
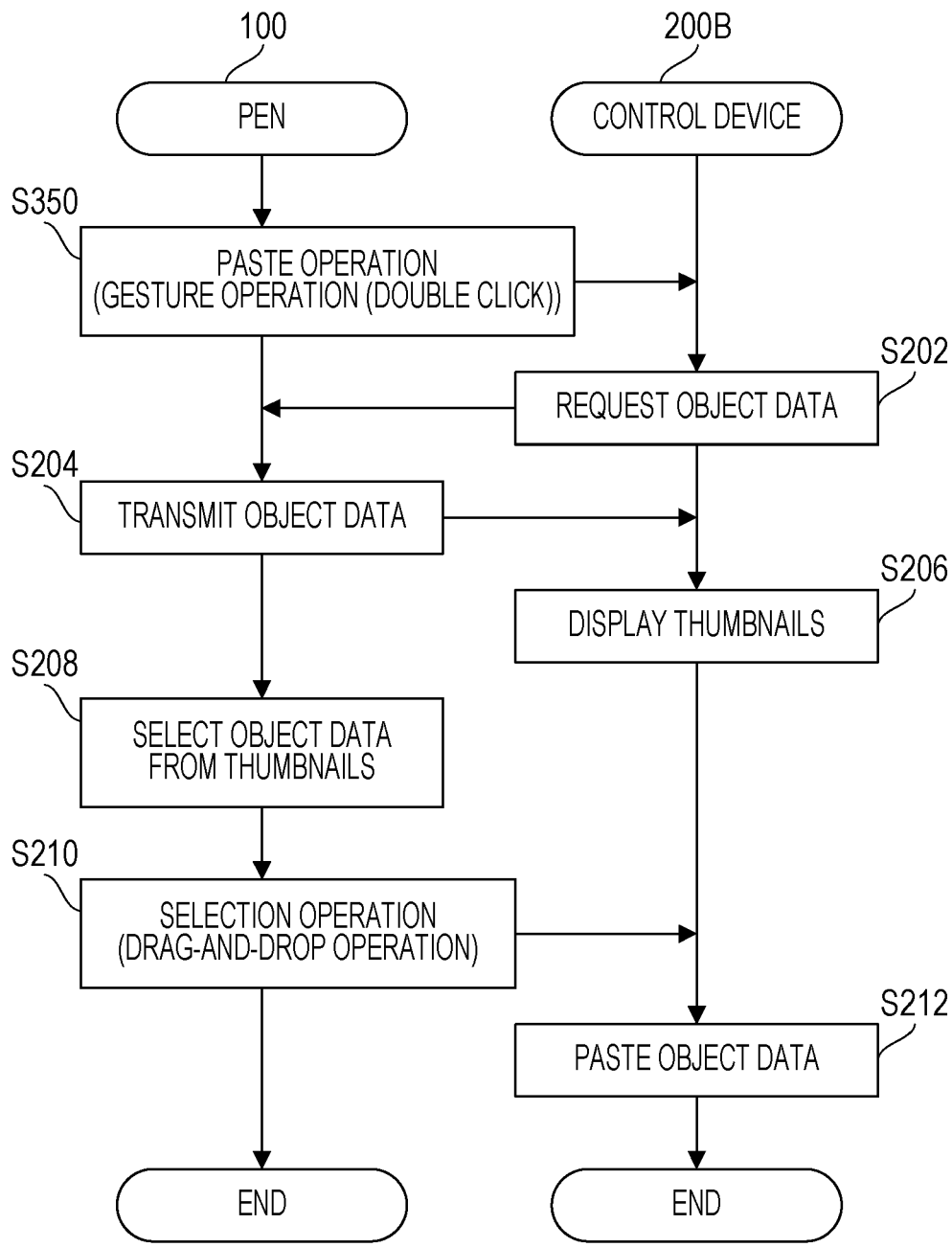
FIG. 15 is a flowchart illustrating a paste process as an operation of the display system according to the third embodiment.

FIG. 15 is a flowchart illustrating the paste process as an operation of the display system according to the third embodiment.

First, the user performs a paste operation using the pen 100 (step S350). The paste operation is performed as a gesture operation performed on the touch panel display device 300B. For example, it is assumed that the gesture operation that represents the paste operation is an operation of the user double-clicking on the touch panel display device 300B with the pen 100 within a second set time (for example, 0.5 seconds). Then, step S202 and the subsequent steps in the first embodiment are performed.

As described above, in the display system according to the third embodiment, the copy operation and the paste operation correspond to the different specific gesture operations, namely, the "hold" and "double-click" operations respectively. Accordingly, in the display system according to the third embodiment, the copy operation and the paste operation can be performed as simple operations.

4. Fourth Embodiment

Now, a fourth embodiment is described. The fourth embodiment has the same functions and configurations as those of the first embodiment; however, the copy process in the first embodiment illustrated in FIG. 5 is replaced by a copy process illustrated in FIG. 16. In this embodiment, this process is focused and described. Note that processes in this embodiment that are the same as those in the first embodiment are assigned the same reference numerals as those in the first embodiment, and detailed descriptions thereof are omitted.

4.1 Copy Process

Figure 16:
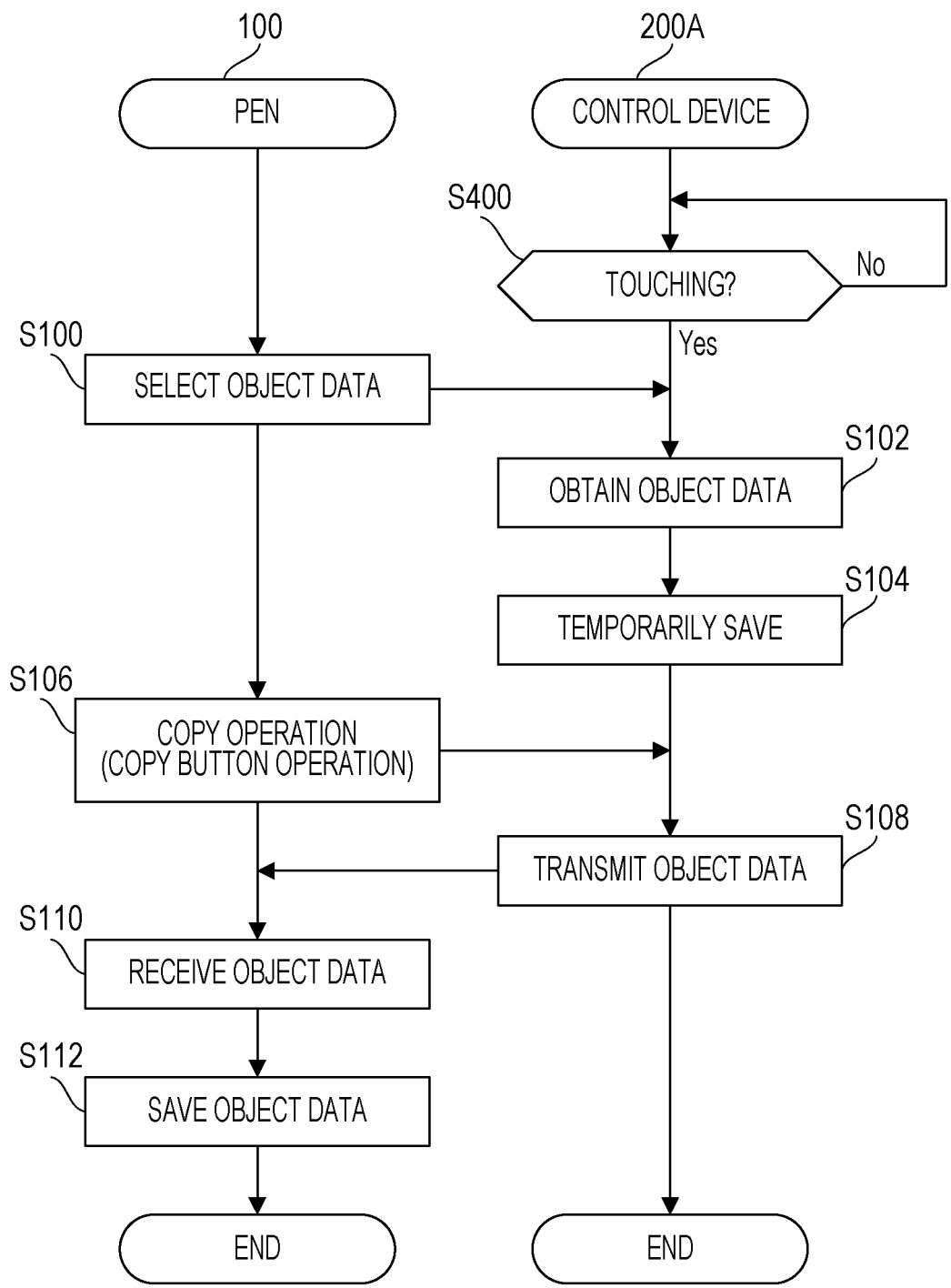
FIG. 16 is a flowchart illustrating a copy process as an operation of the display system according to a fourth embodiment.

FIG. 16 is a flowchart illustrating the copy process as an operation of the display system according to the fourth embodiment.

First, the control unit 210 of the control device 200A checks if the user is touching the touch panel display device 300A (step S400). If the user is not touching the touch panel display device 300A (No in step S400), step S400 is performed again.

Coordinate data that represents the user's touch (the user's hand in contact with the touch panel display device 300A) indicates the positions of corresponding capacitive sensors when the input detection unit 320 detects the user's touch among the capacitive sensors arranged in a matrix on the display unit 310 in the touch panel display device 300A. For example, the input detection unit 320 detects the user's touch on the basis of a condition that the number of capacitive sensors having a capacitance equal to or larger than a set capacitance is equal to or larger than a set number of sensors.

If the user is touching the touch panel display device 300A (Yes in step S400), step S100 and the subsequent steps in the first embodiment are performed.

As described above, in the display system according to the fourth embodiment, in a case where the first selection operation is performed while the user is touching the display device (the touch panel display device 300A), the control unit (the control unit 210 of the control device 200A) obtains at least one piece of object data (the piece of object data D10, D12, D20, or D22). Accordingly, in the display system according to the fourth embodiment, the user can select any of the pieces of object data D10, D12, D20, and D22 in a case where the user performs the first selection operation (the operation of the user drawing a curved line with the pen 100 so as to encircle any of the pieces of object data D10, D12, D20, and D22 displayed on the touch panel display device 300A) while touching the touch panel display device 300A. As a consequence, in the display system according to the fourth embodiment, the case of selecting any of the pieces of object data D10, D12, D20, and D22 can be distinguished from a case of the user drawing (inputting) a circle with the pen 100, for example.

5. Fifth Embodiment

Now, a fifth embodiment is described. In the fifth embodiment, the functions of the pen 100 in the first embodiment as illustrated in FIG. 4 are replaced by functions illustrated in FIG. 17. In this embodiment, these functions are focused and described. Note that functions in this embodiment that are the same as those in the first embodiment are assigned the same reference numerals as those in the first embodiment, and detailed descriptions thereof are omitted.

5.1 Pen 100

Figure 17:
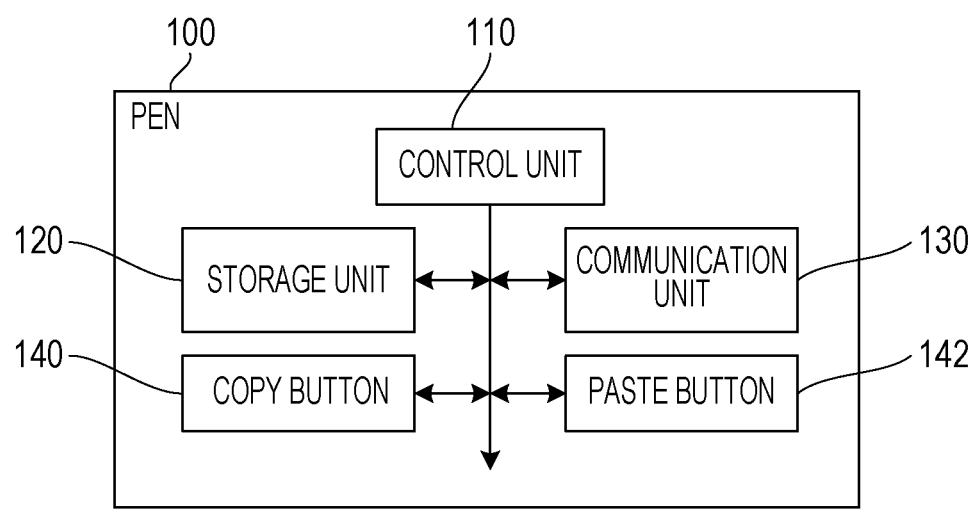
FIG. 17 is a block diagram illustrating a functional configuration of the pen of the display system according to a fifth embodiment.

FIG. 17 is a block diagram illustrating a functional configuration of the pen 100 of the display system according to the fifth embodiment. As illustrated in FIG. 17, the pen 100 further includes a copy button 140 and a paste button 142. The copy button 140 has a function equivalent to that of the copy button 330 in the first embodiment, that is, the copy button 330 displayed in the display area W2 of the touch panel display devices 300A and 300B. The paste button 142 has a function equivalent to that of the paste button 332 in the first embodiment, that is, the paste button 332 displayed in the display area W2 of the touch panel display devices 300A and 300B.

As described above, in the display system according to the fifth embodiment, the pen 100 further includes the copy button 140 used to perform the copy operation and the paste button 142 used to perform the paste operation, and the copy operation and the paste operation respectively correspond to an operation of the copy button 140 and an operation of the paste button 142. Accordingly, in the display system according to the fifth embodiment, the copy operation and the paste operation can be performed as simple operations.

6. Sixth Embodiment

Now, a sixth embodiment is described. In the first embodiment, each of the plurality of pieces of object data is data that represents text (characters, numbers, and so on) or graphics (graphs, tables, and so on). In the sixth embodiment, each of the plurality of pieces of object data need not be data that represents text (characters, numbers, and so on) or graphics (graphs, tables, and so on) and may be data that represents the entire screen.

Figure 18:
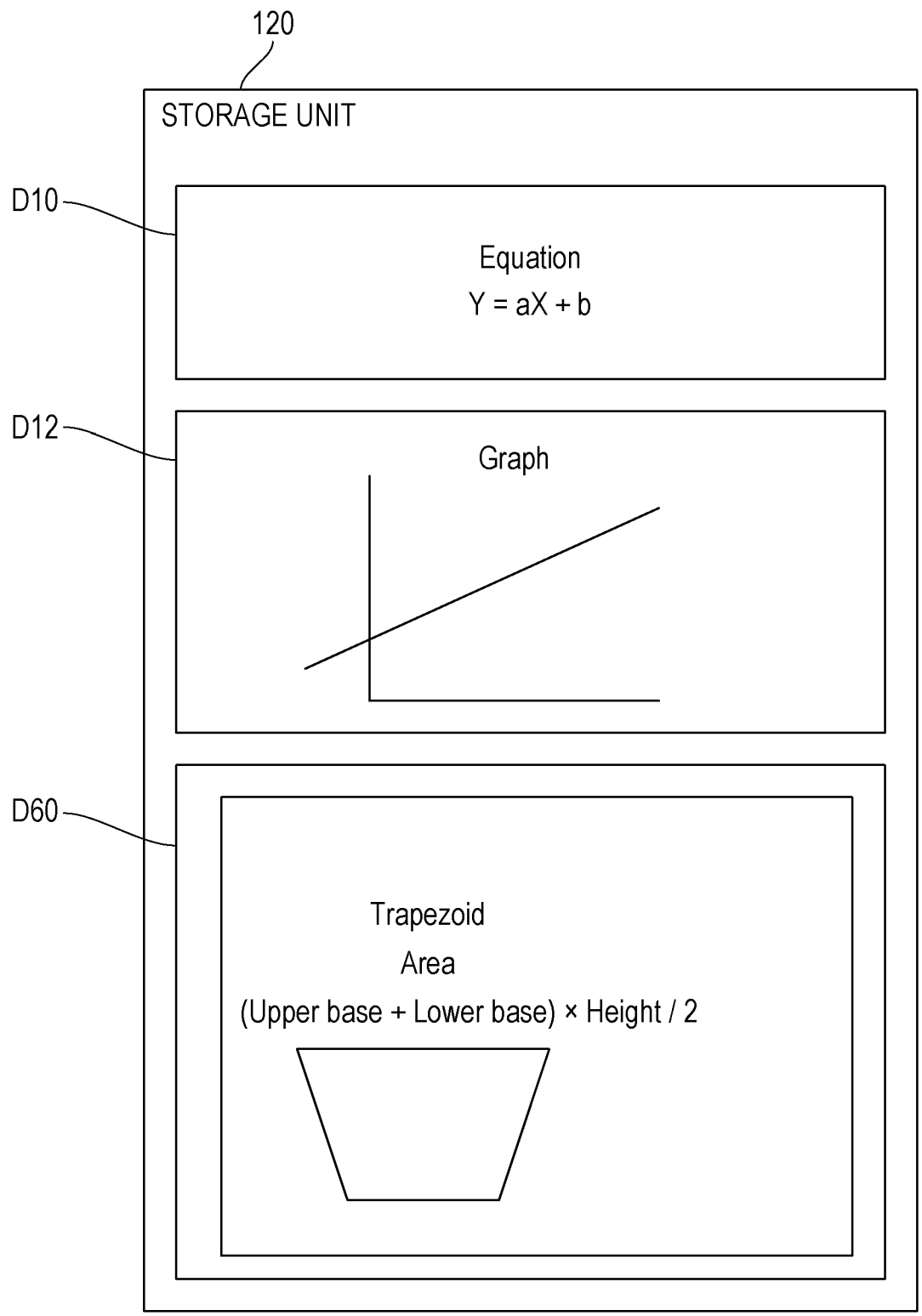
FIG. 18 is a diagram for describing contents stored in a storage unit of the pen of the display system according to a sixth embodiment.

FIG. 18 is a diagram for describing contents stored in the storage unit 120 of the pen 100 of the display system according to the sixth embodiment. Among the plurality of pieces of object data stored in the storage unit 120, the piece of object data D10 represents text, namely, the characters "Equation" and the expression "Y=aX+b", as in the first embodiment. Among the plurality of pieces of object data stored in the storage unit 120, the piece of object data D12 represents text, namely, the characters "Graph", and graphics, namely, the graph of "Y=aX+b", as in the first embodiment. Among the plurality of pieces of object data stored in the storage unit 120, a piece of object data D60 represents data of the entire screen (for example, the display screen of the touch panel display device 300A) that includes data that represents text, namely, the characters "Trapezoid", "Area", and "(Upper base+Lower base)×Height/2", and data that represents graphics, namely, a trapezoid.

7. Seventh Embodiment

Now, a seventh embodiment is described. In the copy process, a plurality of pieces of object data are saved (stored) in the storage unit 120 of the pen 100 in the first embodiment. In the seventh embodiment, a plurality of pieces of object data may be saved (stored) in the storage unit 120 of the pen 100 together with attribute data.

7.1 Copy Process

The copy process is described with reference to FIG. 5 as an operation of the display system according to the seventh embodiment.

First, the copy process for the pieces of object data D10 and D12 is performed. In this case, when steps S100, S102, and S104 are performed, the control unit 210 of the control device 200A temporarily saves the pieces of object data D10 and D12 in the storage unit 220 and also temporarily saves the date and time of the saving "1/21/2016 14:00" in the storage unit 220 as attribute data A10.

Further, the copy process for the pieces of object data D20 and D22 is performed. In this case, when steps S100, S102, and S104 are performed, the control unit 210 of the control device 200A temporarily saves the pieces of object data D20 and D22 in the storage unit 220 and also temporarily saves the date and time of the saving "1/21/2016 15:00" in the storage unit 220 as attribute data A20.

Next, when steps S106, S108, S110, and S112 are performed, the control unit 110 of the pen 100 receives from the control device 200A and saves (stores) in the storage unit 120 data in which the pieces of object data D10 and D12 are associated with the attribute data A10 and data in which the pieces of object data D20 and D22 are associated with the attribute data A20.

Figure 19:
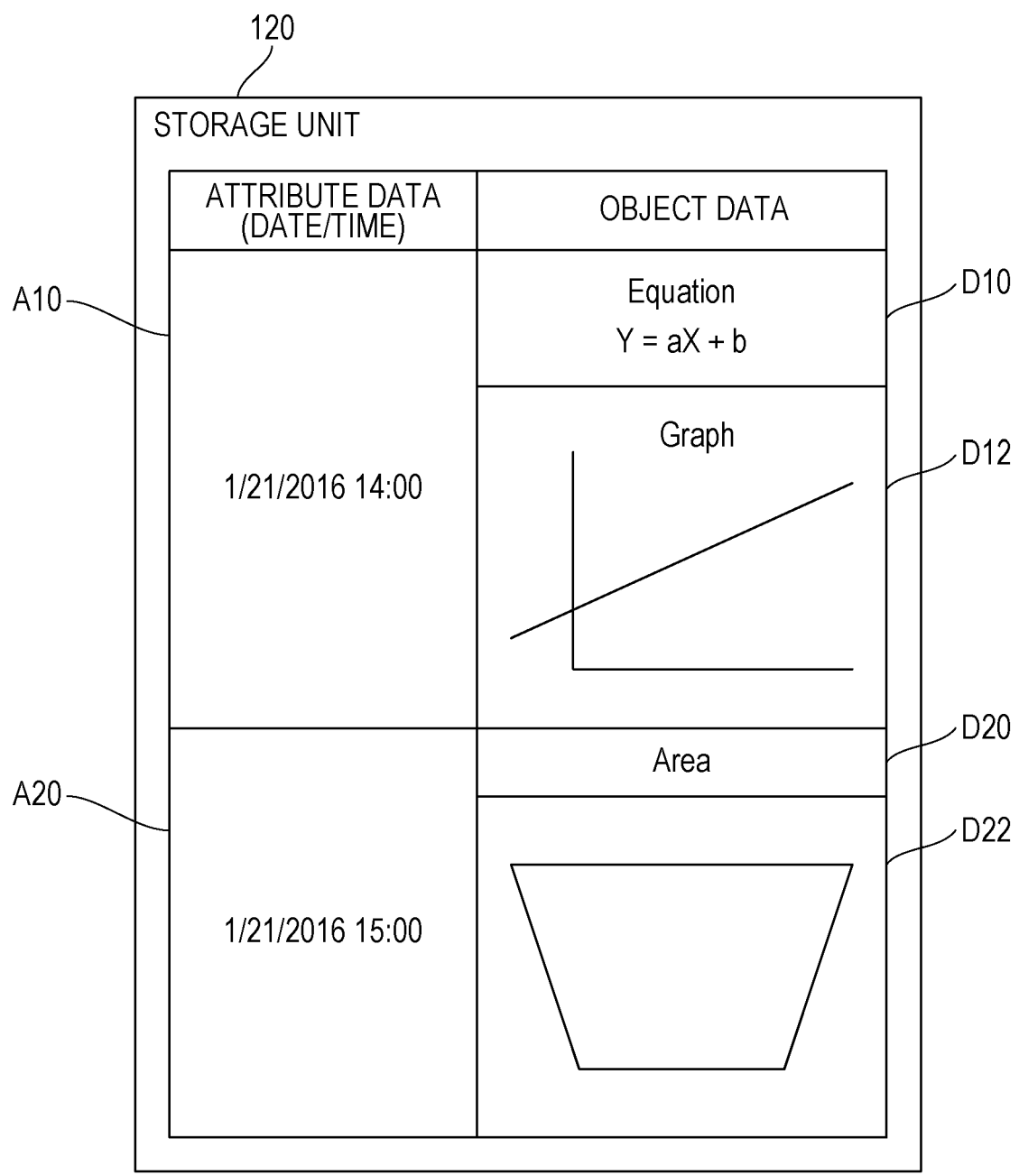
FIG. 19 is a diagram for describing contents stored in the storage unit of the pen of the display system according to a seventh embodiment.

FIG. 19 is a diagram for describing contents stored in the storage unit 120 of the pen 100 of the display system according to the seventh embodiment. In the storage unit 120 of the pen 100, the data in which the pieces of object data D10 and D12 are associated with the attribute data A10 and the data in which the pieces of object data D20 and D22 are associated with the attribute data A20 are saved.

Figure 21:
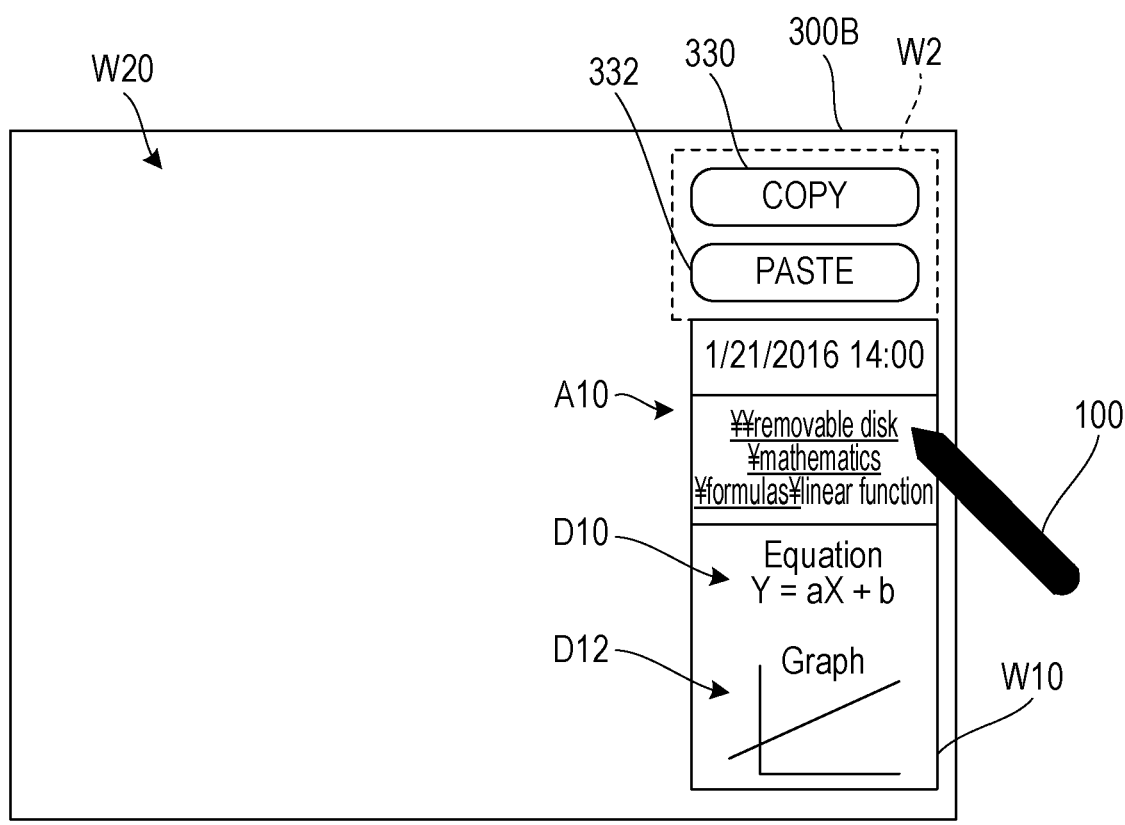
FIG. 21 illustrates an example display screen displayed on the touch panel display device as an operation of the display system according to the seventh embodiment.

Further, a usage scenario as illustrated in FIGS. 20 and 21 is possible. As illustrated in FIG. 20, the attribute data A10 and the attribute data A20 each include file information. Specifically, the attribute data A10 includes file information "¥¥removable disk¥mathematics¥formulas¥linear function" in addition to the date and time "1/21/2016 14:00". The attribute data A20 includes file information "¥¥removable disk¥mathematics¥formulas¥area" in addition to the date and time "1/21/2016 15:00".

In addition to the case of copying object data at a timing when the object data is drawn, there may be a case of drawing object data for a file that is being displayed and saving the updated file. If the file is an updated file that includes a plurality of newly drawn pieces of object data, the plurality of pieces of object data may be saved, or file information about the saved file as well as the date and time may be included in the saved pieces of object data as identification information. In a case where the user performs the paste process for the plurality of pieces of object data on the display device (the touch panel display device 300B), the user needs to perform a touch operation on the displayed attribute information (file information) about the plurality of pieces of object data instead of individually selecting the pieces of object data. As illustrated in FIG. 21, in a case where a touch operation is performed on the file information "¥¥removable disk¥mathematics¥formulas¥linear function" in the attribute data A10 of the displayed pieces of object data D10 and D12 by using the pen 100, the file opens and is displayed on the screen. Accordingly, the user can display the file that includes the plurality of drawn pieces of object data.

8. Eighth Embodiment

Now, an eighth embodiment is described. In a paste process in the eighth embodiment, when the plurality of pieces of object data D10, D12, D20, and D22 saved (stored) in the storage unit 120 of the pen 100 are displayed as thumbnails, the attribute data A10 and the attribute data A20 in the seventh embodiment may also be displayed.

8.1 Paste Process

The paste process is described with reference to FIG. 6 as an operation of the display system according to the eighth embodiment.

First, the user performs a paste operation using the pen 100 (step S200).

At this time, the control unit 210 of the control device 200B transmits an object data request to the pen 100 for requesting the plurality of pieces of object data D10, D12, D20, and D22 and the attribute data A10 and attribute data A20 in response to the paste operation performed by using the pen 100 (step S202).

The control unit 110 of the pen 100 reads the data in which the pieces of object data D10 and D12 are associated with the attribute data A10 and the data in which the pieces of object data D20 and D22 are associated with the attribute data A20 from the storage unit 120 in response to the object data request from the control device 200B and transmits the read pieces of data to the control device 200B via the communication unit 130 (step S204).

At this time, the control unit 210 of the control device 200B receives the data in which the pieces of object data D10 and D12 are associated with the attribute data A10 and the data in which the pieces of object data D20 and D22 are associated with the attribute data A20 from the pen 100 and displays the received pieces of data in the display area W10 of the touch panel display device 300B as thumbnails (step S206). Thereafter, step S208 and the subsequent steps are performed.

Figure 22:
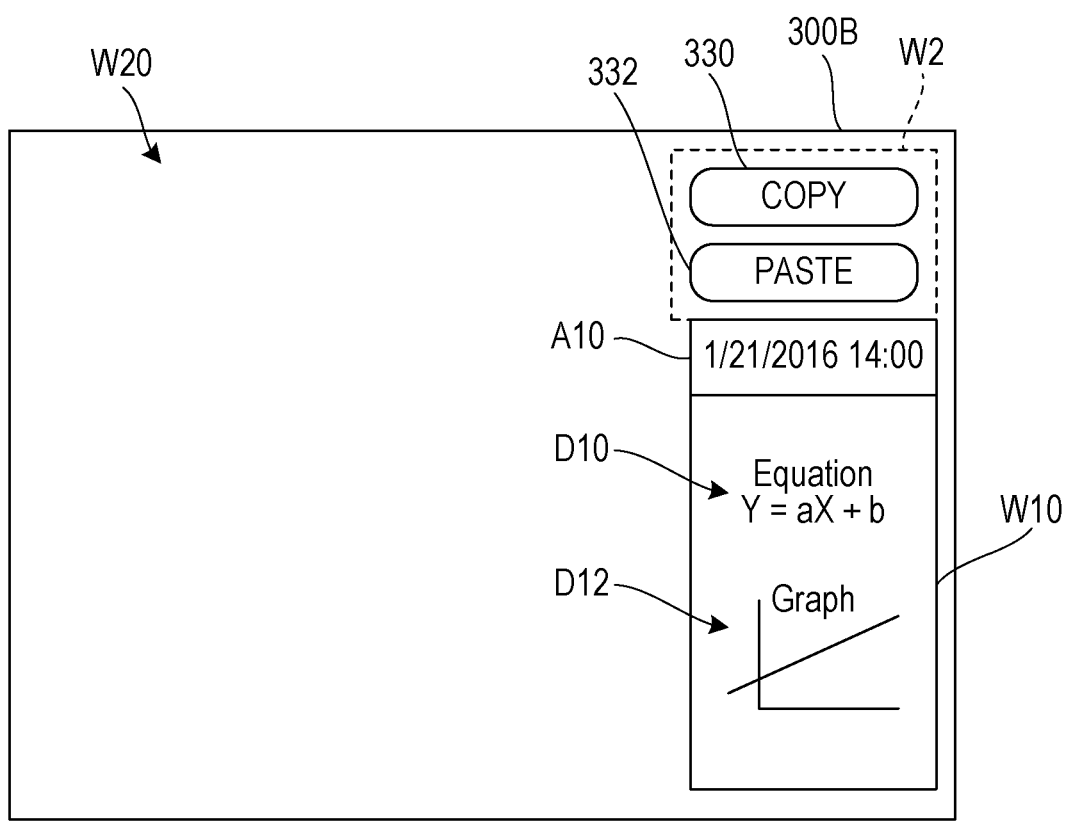
FIG. 22 illustrates an example display screen displayed on the touch panel display device as an operation of the display system according to an eighth embodiment.
Figure 23:
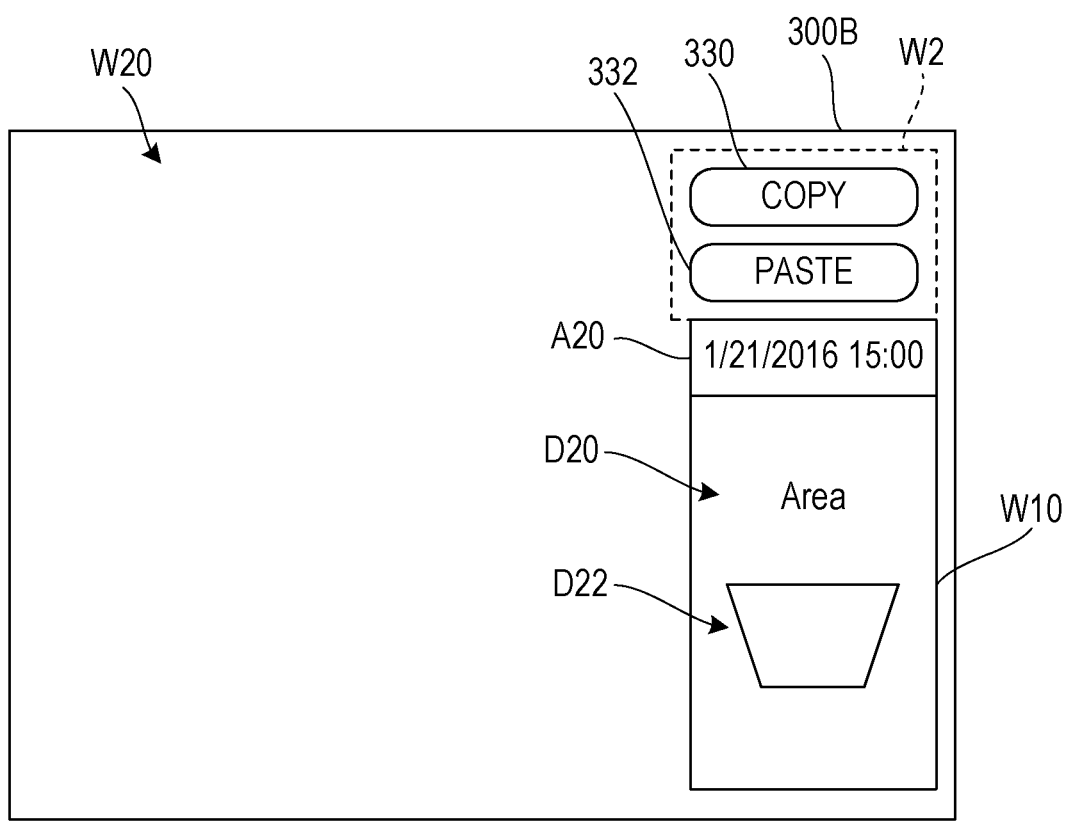
FIG. 23 illustrates an example display screen displayed on the touch panel display device as an operation of the display system according to the eighth embodiment.

FIGS. 22 and 23 each illustrate an example display screen displayed on the touch panel display device 300B as an operation of the display system according to the eighth embodiment. As illustrated in FIG. 22, the data in which the pieces of object data D10 and D12 are associated with the attribute data A10 is displayed in the display area W10 of the touch panel display device 300B as thumbnails in step S206. Here, it is assumed that the process in step S208 has not been performed and that a predetermine time has elapsed. In this case, as illustrated in FIG. 23, the data in which the pieces of object data D20 and D22 are associated with the attribute data A20 is displayed in the display area W10 of the touch panel display device 300B as thumbnails. That is, in the display area W10 of the touch panel display device 300B, the displayed data changes from the data in which the pieces of object data D10 and D12 are associated with the attribute data A10 to the data in which the pieces of object data D20 and D22 are associated with the attribute data A20.

9. Ninth Embodiment

Now, a ninth embodiment is described. In a case where a selected piece of object data (for example, the piece of object data D12) is moved from the display area W10 of the touch panel display device 300B to the display area W20 of the touch panel display device 300B in the paste process, the piece of object data D12 in the display area W10 remains displayed in the first embodiment; however, the piece of object data D12 in the display area W10 may be deleted in the ninth embodiment.

9.1 Paste Process

The paste process is described with reference to FIG. 6 as an operation of the display system according to the ninth embodiment.

First, steps S200, S202, S204, S206, S208, and S210 are performed. In this case, the control unit 210 of the control device 200B displays the piece of object data D12 selected from among the plurality of pieces of object data D10, D12, D20, and D22 displayed in the display area W10 of the touch panel display device 300B as thumbnails in the display area W20 of the touch panel display device 300B in response to the second selection operation (drag-and-drop operation) performed by using the pen 100. At this time, the control unit 210 of the control device 200B deletes the selected piece of object data D12 among the plurality of pieces of object data D10, D12, D20, and D22 displayed in the display area W10 of the touch panel display device 300B as thumbnails (step S212).

Figure 24:
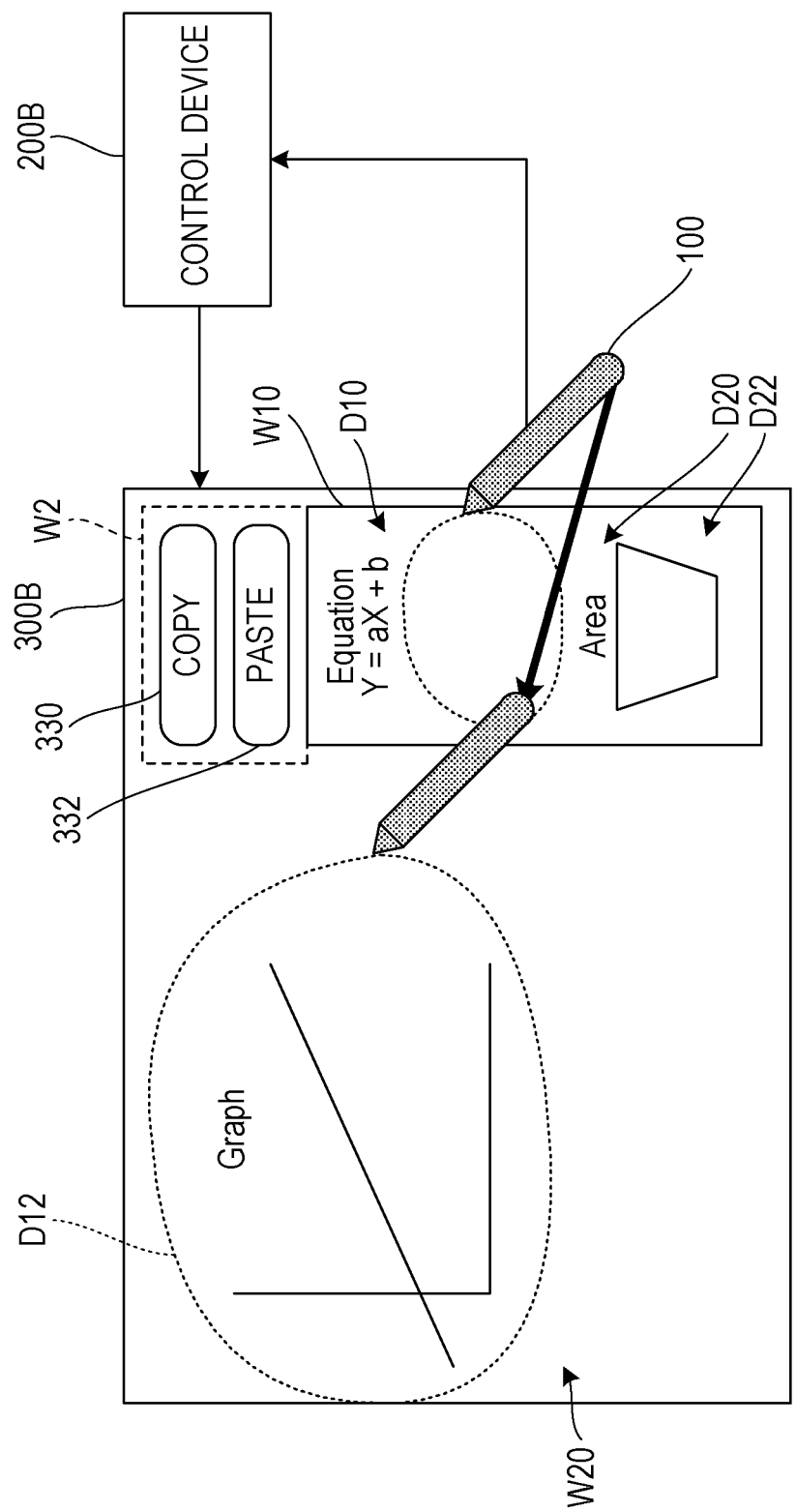
FIG. 24 illustrates an example display screen displayed on the touch panel display device as an operation of the display system according to a ninth embodiment.

FIG. 24 illustrates an example display screen displayed on the touch panel display device 300B as an operation of the display system according to the ninth embodiment. As illustrated in FIG. 24, the selected piece of object data D12 is deleted in step S212 among the plurality of pieces of object data D10, D12, D20, and D22 displayed in the display area W10 of the touch panel display device 300B as thumbnails.

10. Tenth Embodiment

Now, a tenth embodiment is described. In the first embodiment, the first and second display devices are the touch panel display devices 300A and 300B respectively. In the tenth embodiment, the second display device may be implemented as a transmissive touch panel display device and an image projection device (a device such as a projector).

The transmissive touch panel display device includes a transmissive projection sheet, capacitive sensors, a transmissive substrate, and a low-reflection film. The projection sheet corresponds to the display unit 310 in the first embodiment, and an image from the image projection device is projected onto the front surface of the projection sheet. The capacitive sensors correspond to the capacitive sensors of the input detection unit 320 (the capacitive sensors arranged in a matrix on the display unit 310) in the first embodiment and are arranged between the back surface of the projection sheet and the front surface of the substrate so as to form a coordinate plane. In order to reduce reflection of external light, the back surface of the substrate is covered by the front surface of the low-reflection film.

The control unit 210 of the control device 200B controls the image projection device so that the copy button 330 used to perform a copy operation and the paste button 332 used to perform a paste operation are projected (displayed) onto the display area W2 of the transmissive touch panel display device.

For example, the control unit 210 of the control device 200B obtains coordinate data that represents the paste button 332 displayed in the display area W2 of the transmissive touch panel display device in response to a change in the capacitance of the capacitive sensors to thereby recognize the operation of the paste button 332. The coordinate data that represents the paste button 332 indicates the positions of corresponding capacitive sensors when the input detection unit 320 detects the operation of the paste button 332 among the capacitive sensors arranged in a matrix between the back surface of the projection sheet and the front surface of the substrate in the transmissive touch panel display device. In this case, the control unit 210 of the control device 200B controls the image projection device so as to project (display) the plurality of pieces of object data D10, D12, D20, and D22 from the pen 100 onto the first display area (corresponding to the display area W10 in the first embodiment) of the transmissive touch panel display device as thumbnails.

For example, the control unit 210 of the control device 200B obtains coordinate data that represents a selection operation (drag-and-drop operation) performed by using the pen 100 in response to a change in the capacitance of the capacitive sensors to thereby recognize the selection operation. The coordinate data that represents the selection operation indicates the positions of corresponding capacitive sensors when the input detection unit 320 detects the selection operation (drag-and-drop operation) among the capacitive sensors arranged in a matrix between the back surface of the projection sheet and the front surface of the substrate in the transmissive touch panel display device. In this case, the control unit 210 of the control device 200B controls the image projection device so as to project (display) the piece of object data D12 selected from among the plurality of pieces of object data D10, D12, D20, and D22 displayed in the display area W10 of the transmissive touch panel display device as thumbnails onto the second display area (corresponding to the display area W20 in the first embodiment) of the transmissive touch panel display device in response to the selection operation performed by using the pen 100.

11. Eleventh Embodiment

Now, an eleventh embodiment is described. In the eleventh embodiment, the touch panel display device 300B and the control device 200B that controls the touch panel display device 300B may be provided in a portable terminal, such as a tablet terminal or a smartphone. In this case, it is desirable to change the size of the plurality of pieces of object data D10, D12, D20, and D22 on the basis of the ratio between the size of the touch panel display device 300A and the size of the touch panel display device 300B.

12. Twelfth Embodiment

Now, a twelfth embodiment is described. In the twelfth embodiment, the touch panel display device 300B and the control device 200B that controls the touch panel display device 300B may be provided in a multifunction machine. The multifunction machine includes an image forming unit that implements a copy function, a facsimile function, and so on. In this case, it is possible to print the plurality of pieces of object data D10, D12, D20, and D22 by using the copy function of the image forming unit or transmit the plurality of pieces of object data D10, D12, D20, and D22 by using the facsimile function of the image forming unit.

13. Thirteenth Embodiment

Now, a thirteenth embodiment is described. In the first embodiment, the first and second control devices are the control devices 200A and 200B respectively. In the thirteenth embodiment, the control devices 200A and 200B may be implemented as a single server.

13.1 Overall Configuration

Figure 25:
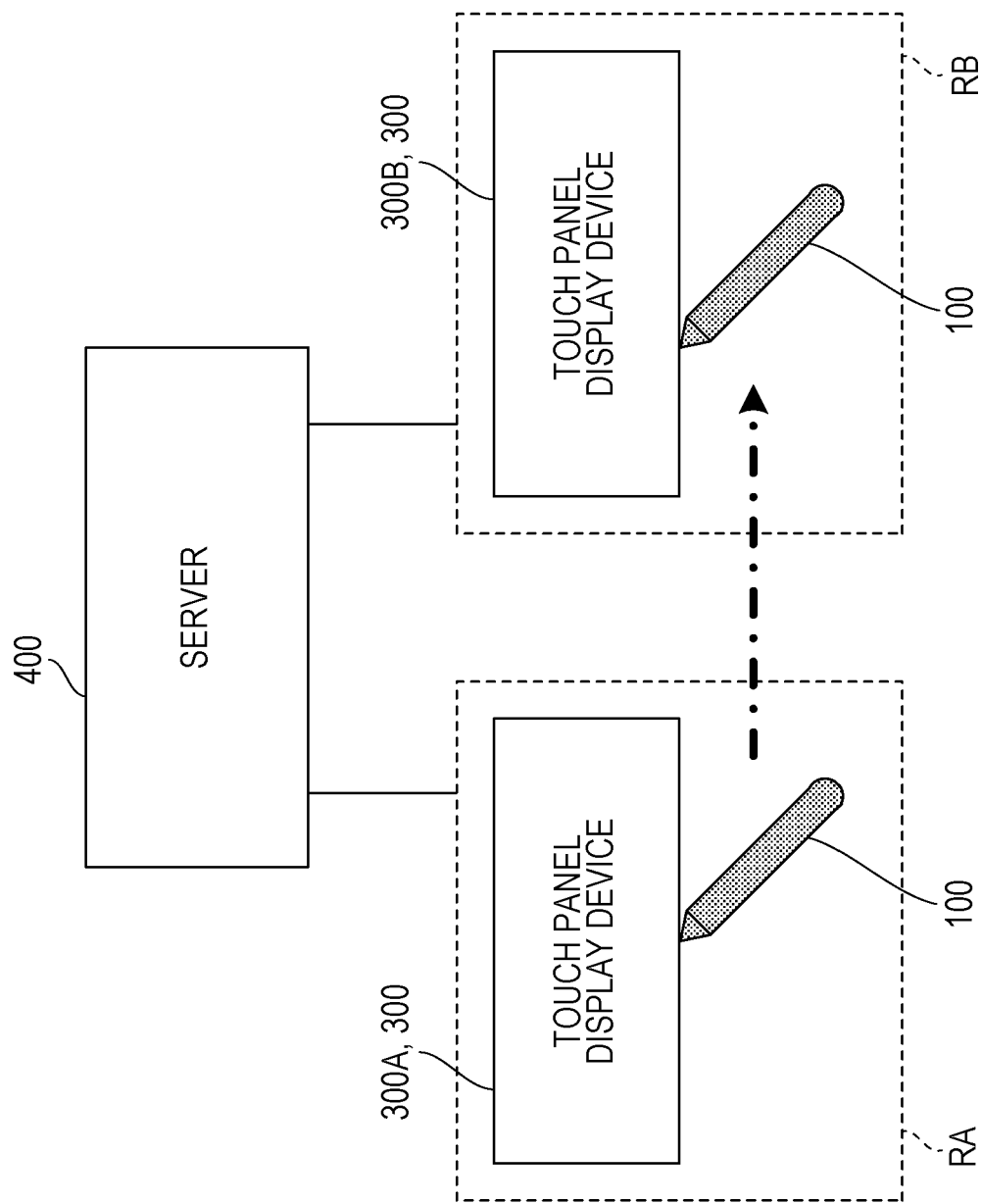
FIG. 25 is a diagram for describing an overview of the display system according to a thirteenth embodiment.

First, the overall configuration is described with reference to FIG. 25. FIG. 25 is a diagram for describing an overview of the display system according to the thirteenth embodiment. The display system includes the pen 100, a server 400, and the plurality of touch panel display devices 300.

13.2 Server 400

Figure 26:
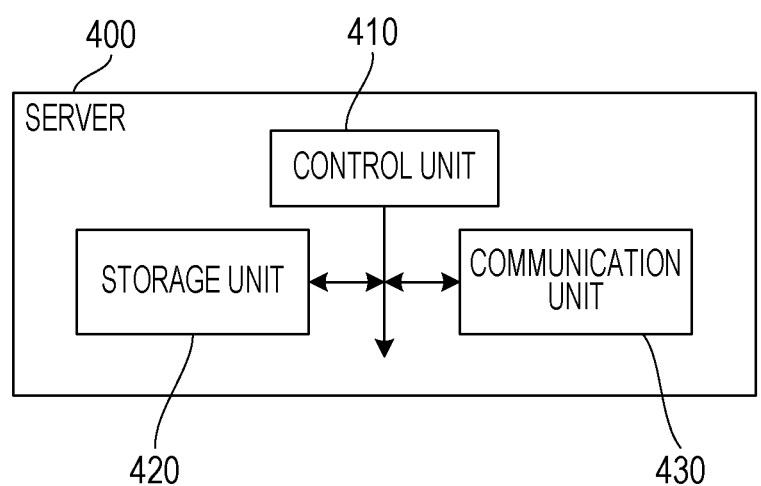
FIG. 26 is a block diagram illustrating a functional configuration of a server of the display system according to the thirteenth embodiment.

FIG. 26 is a block diagram illustrating a functional configuration of the server 400 of the display system according to the thirteenth embodiment. As illustrated in FIG. 26, the server 400 includes a control unit 410, a storage unit 420, and a communication unit 430.

The control unit 410 is a functional unit for controlling the server 400 on the whole. The control unit 410 reads and executes various programs stored in the storage unit 420 to thereby implement various functions and is constituted by a CPU and so on, for example. The control unit 410 implements the functions of the control unit 210 of the control device 200A in the first embodiment and the functions of the control unit 210 of the control device 200B in the first embodiment.

The storage unit 420 is a functional unit in which various programs and various types of data used in operations of the server 400 are stored. The storage unit 420 is constituted by a semiconductor memory or an HDD, for example. The storage unit 420 implements the functions of the storage unit 220 of the control device 200A in the first embodiment and the functions of the storage unit 220 of the control device 200B in the first embodiment.

The communication unit 430 is a functional unit for the server 400 to communicate with the pen 100. The communication unit 430 implements the functions of the communication unit 230 of the control device 200A in the first embodiment and the functions of the communication unit 230 of the control device 200B in the first embodiment.

13.3 Process Flows

Now, process flows in this embodiment are described with reference to the drawings.

13.3.1 Copy Process

Figure 27:
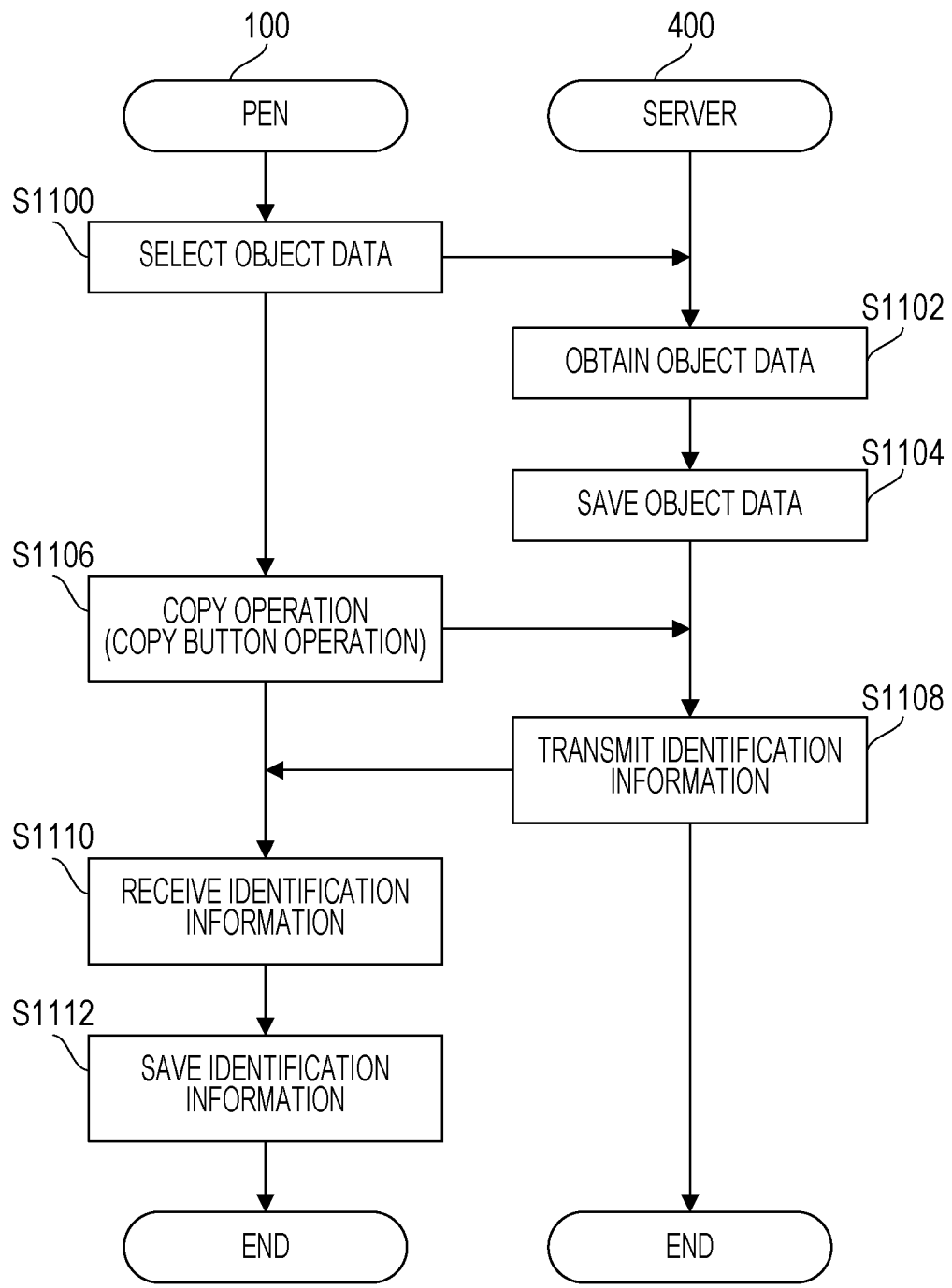
FIG. 27 is a flowchart illustrating a copy process as an operation of the display system according to the thirteenth embodiment.

FIG. 27 is a flowchart illustrating a copy process as an operation of the display system according to the thirteenth embodiment. The user performs the copy process by using the pen 100 in the classroom RA.

First, the user draws (inputs) a plurality of pieces of object data on the touch panel display device 300A. Next, the user performs a first selection operation using the pen 100. The first selection operation performed by using the pen 100 is an operation of drawing a curved line with the pen 100 so as to encircle at least one piece of object data (the piece of object data D10, D12, D20, or D22) displayed on the touch panel display device 300A (step S1100).

At this time, the control unit 410 of the server 400 obtains the at least one piece of object data (the piece of object data D10, D12, D20, or D22) displayed on the touch panel display device 300A in response to the first selection operation performed by using the pen 100 (step S1102). The control unit 410 of the server 400 saves (stores) the at least one piece of object data (the piece of object data D10, D12, D20, or D22) in the storage unit 420 as part of a plurality of pieces of object data (step S1104).

Next, the user performs a copy operation using the pen 100 (step S1106). The copy operation is performed by operating the copy button 330 displayed on the touch panel display device 300A (see FIGS. 8 and 9).

At this time, the control unit 410 of the server 400 transmits a plurality of pieces of identification information for respectively identifying the plurality of pieces of object data D10, D12, D20, and D22 stored in the storage unit 420 to the pen 100 via the communication unit 430 in response to the copy operation performed by using the pen 100 (step S1108).

The control unit 110 of the pen 100 receives the plurality of pieces of identification information from the server 400 via the communication unit 130 (step S1110) and saves (stores) the plurality of pieces of identification information in the storage unit 120 (step S1112).

13.3.2 Paste Process

Figure 28:
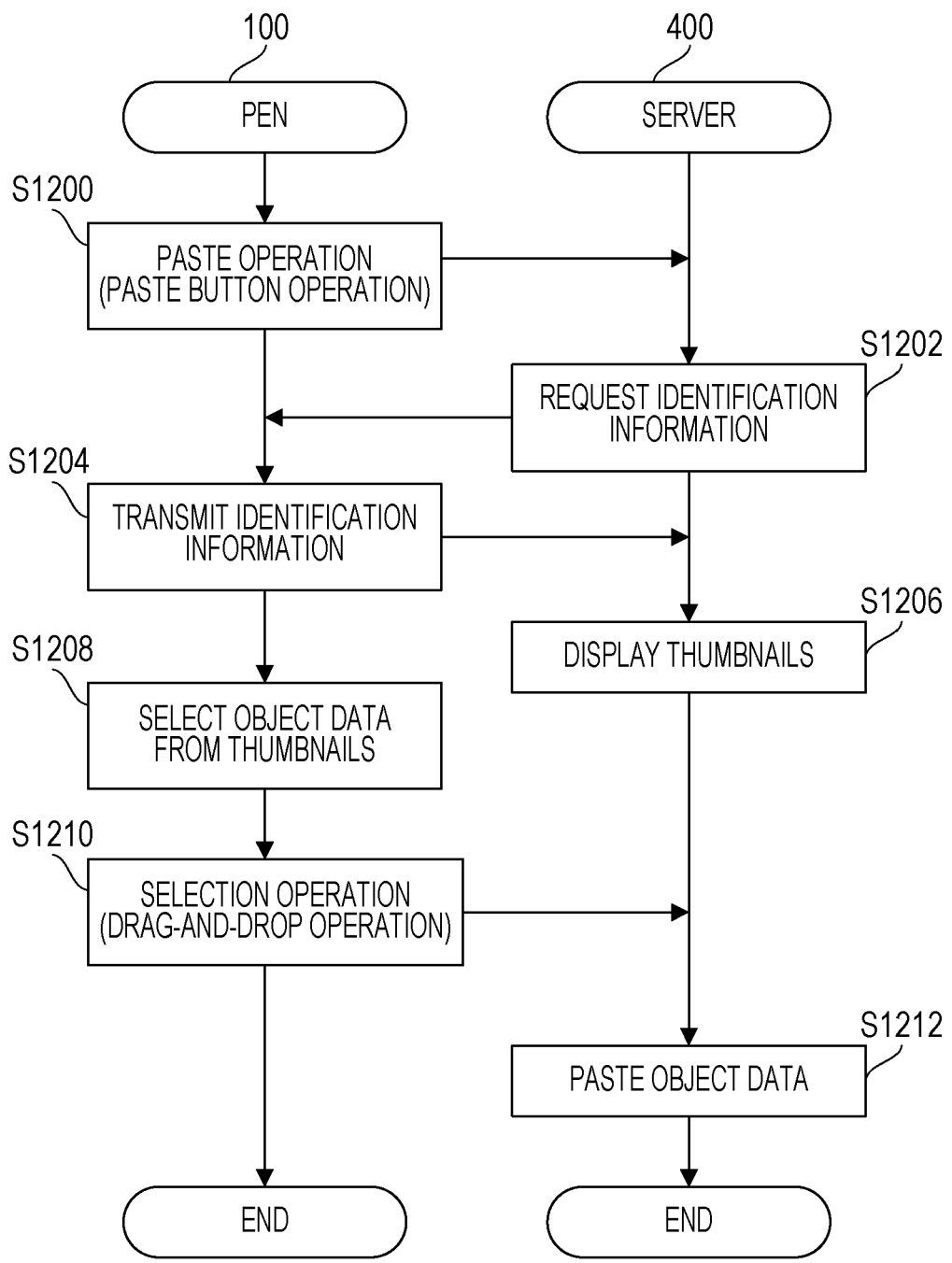
FIG. 28 is a flowchart illustrating a paste process as an operation of the display system according to the thirteenth embodiment.

FIG. 28 is a flowchart illustrating a paste process as an operation of the display system according to the thirteenth embodiment. The user moves from the classroom RA to the classroom RB, and thereafter, performs the paste process by using the pen 100 in the classroom RB.

First, the user performs a paste operation using the pen 100 (step S1200). The paste operation is performed by operating the paste button 332 displayed on the touch panel display device 300B (see FIG. 10).

At this time, the control unit 410 of the server 400 transmits an identification information request to the pen 100 in response to the paste operation performed by using the pen 100 (step S1202).

The control unit 110 of the pen 100 transmits the plurality of pieces of identification information stored in the storage unit 120 to the server 400 via the communication unit 130 in response to the identification information request from the server 400 (step S1204).

At this time, the control unit 410 of the server 400 displays the plurality of pieces of object data D10, D12, D20, and D22 respectively corresponding to the plurality of pieces of identification information from the pen 100 in the first display area (the display area W10) of the touch panel display device 300B as thumbnails (step S1206).

Then, the user selects a desired piece of object data (for example, the piece of object data D12) from among the plurality of pieces of object data D10, D12, D20, and D22 displayed in the display area W10 of the touch panel display device 300B as thumbnails by using the pen 100 (step S1208). Subsequently, the user performs a second selection operation using the pen 100. The second selection operation performed by using the pen 100 is a drag-and-drop operation for moving the selected piece of object data D12 from the display area W10 of the touch panel display device 300B to the second display area (the display area W20) of the touch panel display device 300B and placing the piece of object data D12 in the display area W20 (step S1210).

At this time, the control unit 410 of the server 400 displays, in the display area W20 of the touch panel display device 300B, the piece of object data D12 selected from among the plurality of pieces of object data D10, D12, D20, and D22 displayed in the display area W10 of the touch panel display device 300B as thumbnails in response to the second selection operation performed by using the pen 100.

That is, the selected piece of object data D12 displayed in the display area W10 of the touch panel display device 300B is pasted into the display area W20 of the touch panel display device 300B (step S1212).

14. Fourteenth Embodiment

Now, a fourteenth embodiment is described. The fourteenth embodiment has the same functions and configurations as those of the first embodiment; however, pieces of object data saved in the pen are used to create a question sheet in this embodiment.

Figure 29:
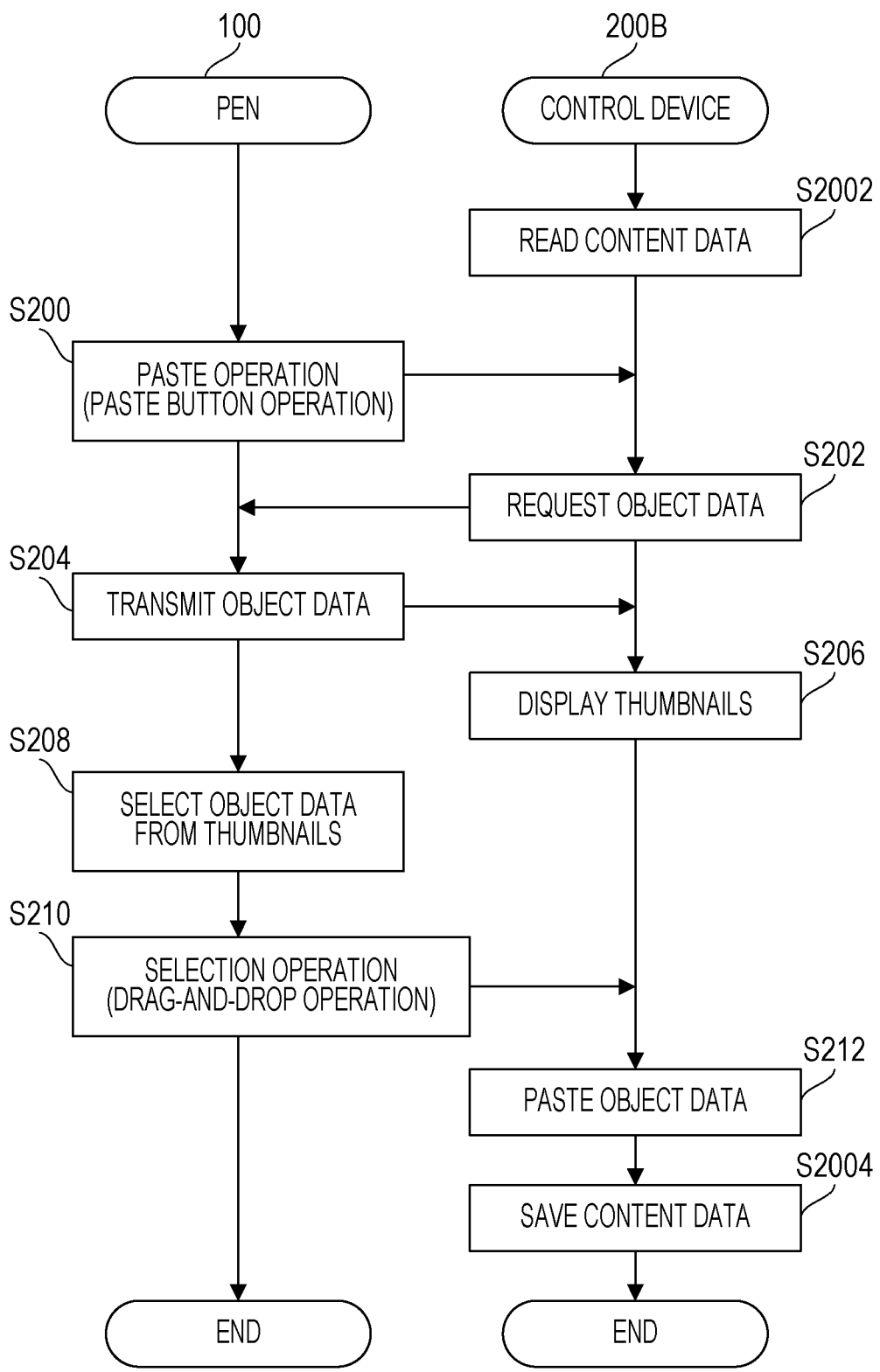
FIG. 29 is a flowchart illustrating a paste process as an operation of the display system according to a fourteenth embodiment.

FIG. 29 is a flowchart of this embodiment created on the basis of FIG. 6 in the first embodiment. Processes in this embodiment that are the same as those in the first embodiment are assigned the same reference numerals as those in the first embodiment, and descriptions thereof are omitted.

In this embodiment, content data created and stored in advance is read (step S2002). Any of the saved pieces of object data is pasted into the content data (steps S200 to S212) to thereby allow creation and editing of content data.

Among the pieces of object data, a plurality of pieces of object data can be pasted by repeatedly performing steps from S200 to S212. For the content data, usual editing operations (for example, a graphics paste operation from a file and a text editing operation) can be performed, as a matter of course.

When all editing processes are completed, the content data is saved at last (step S2004).

Figure 30:
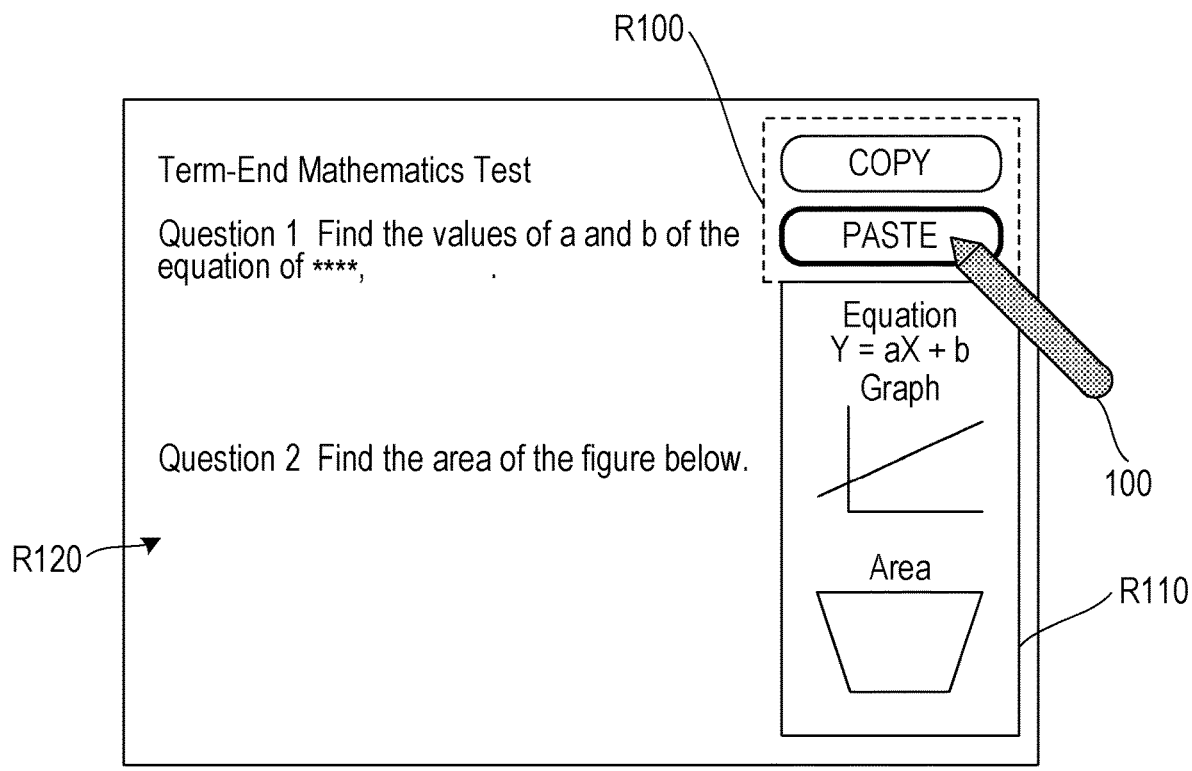
FIG. 30 illustrates an example display screen displayed on the touch panel display device as an operation of the display system according to the fourteenth embodiment.

FIG. 30 illustrates an example operation screen displayed on the touch panel display device as an operation of the display system according to the fourteenth embodiment. Content data is displayed in an area R120 and pieces of object data are displayed in an area R110 as thumbnails.

The pieces of object data displayed as thumbnails are read when the user touches (selects) the "Paste" button displayed in an area R100 using the pen 100. Note that the pieces of object data may be displayed in advance as thumbnails.

Figure 31:
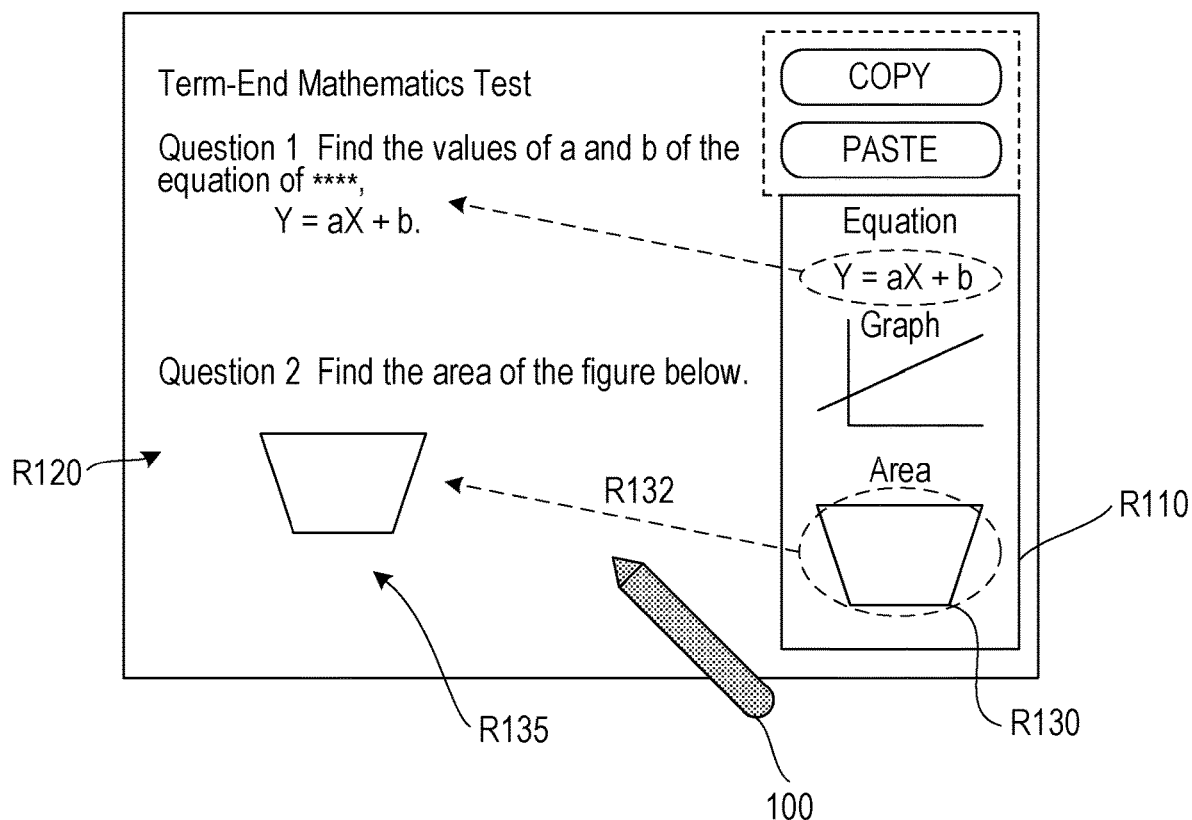
FIG. 31 illustrates an example display screen displayed on the touch panel display device as an operation of the display system according to the fourteenth embodiment.

Here, an example operation screen on which pieces of object data are selected and pasted into the content data is illustrated in FIG. 31. For example, a piece of object data R130 displayed in the area R110 is selected by using the pen 100, dragged in a direction R132, and moved to a desired display area. For example, when the piece of object data R130 is moved to an area R135 of the content data, the piece of object data R130 is displayed in the area R135.

Here, the position of the piece of object data may be identified from corresponding coordinates or may be identified from corresponding row and column positions (the position of characters in the content data).

As described above, according to this embodiment, it is possible to easily paste pieces of object data into displayed content data. That is, it is possible to easily edit content data by selecting pieces of object data from among the saved pieces of object data and using the selected pieces of object data.

15. Fifteenth Embodiment

Now, a fifteenth embodiment is described. In the fifteenth embodiment, a cooperating operation performed in a case where a plurality of pens are used to paste pieces of object data into content data, for example, is described.

Figure 32:
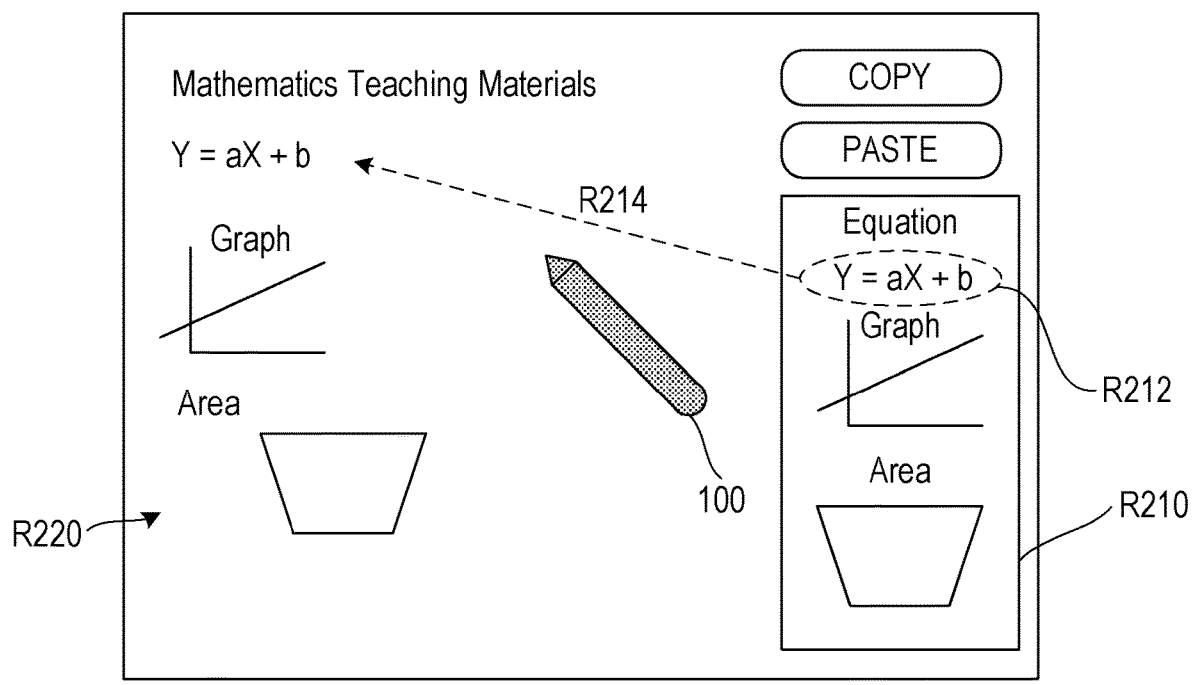
FIG. 32 illustrates an example display screen displayed on the touch panel display device as an operation of the display system according to a fifteenth embodiment.

For example, FIG. 32 is a diagram illustrating a state where a piece of object data displayed in an area R210 is pasted into content data displayed in an area R220 by using the pen 100. In this case, when a piece of object data R212 displayed in the area R210 is dragged in a direction R214, the piece of object data R212 can be easily pasted into the content data.

Figure 33:
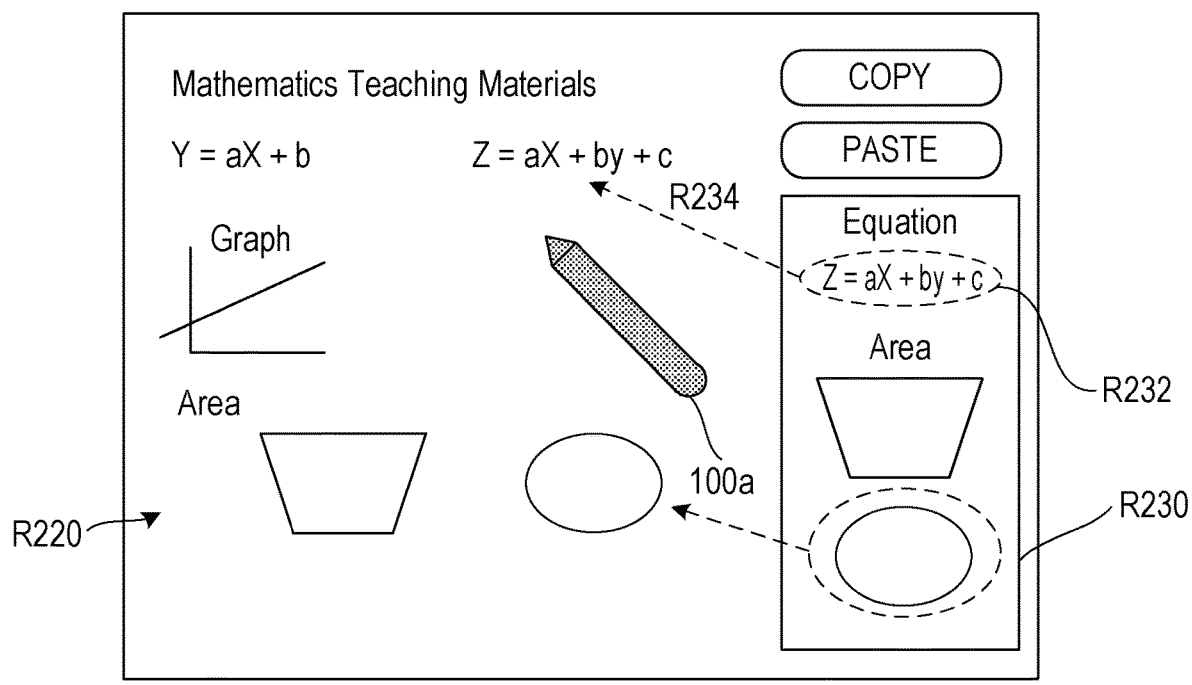
FIG. 33 illustrates an example display screen displayed on the touch panel display device as an operation of the display system according to the fifteenth embodiment.

At this time, pieces of object data saved elsewhere can be read and pasted into the same content data. In FIG. 33, for example, pieces of object associated with and saved in a pen 100a, which is different from the pen 100 in FIG. 32, are displayed in an area R230. For example, when a piece of object data R232 displayed in the area R230 is dragged in a direction R234, the piece of object data R232 can be easily pasted into the content data displayed in the area R220. That is, the piece of object data is pasted into the same content data illustrated in FIG. 32.

Figure 34:
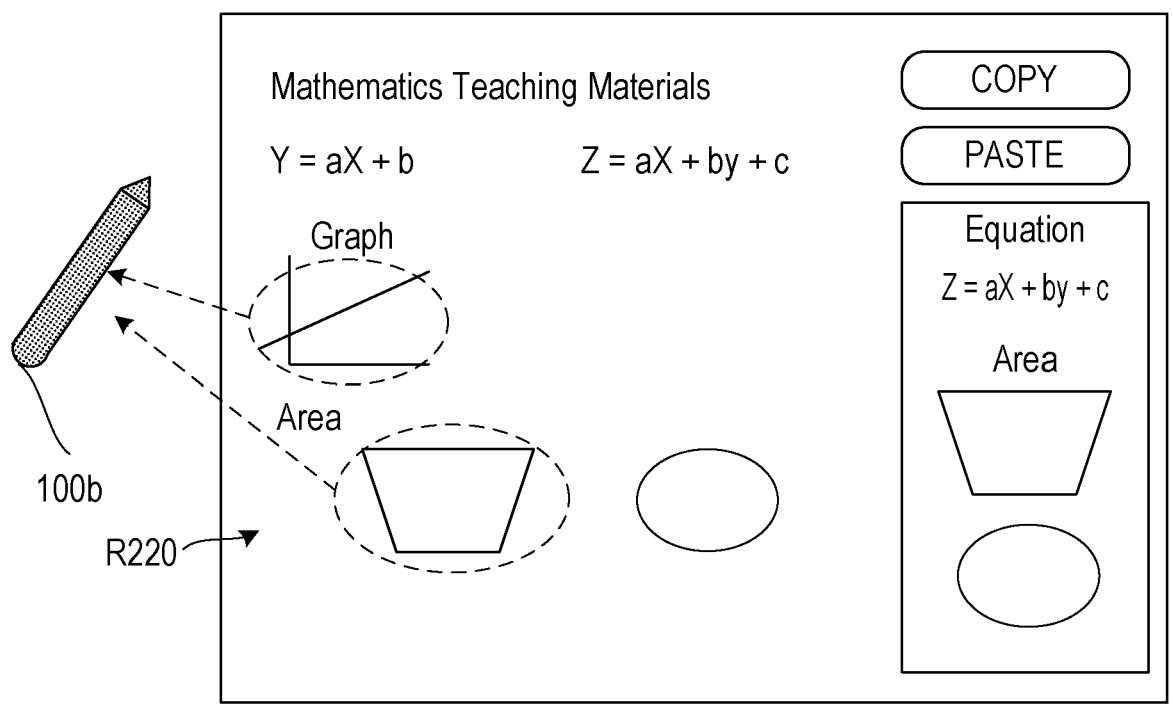
FIG. 34 illustrates an example display screen displayed on the touch panel display device as an operation of the display system according to the fifteenth embodiment.

In FIG. 34, pieces of object data included in the content data displayed in the area R220 are further associated with and saved in a different pen 100b.

That is, pieces of object data that are stored in a pen by performing a copy operation include not only pieces of object data associated with the pen but also pieces of object data stored in a different pen. Accordingly, it is possible to store, on the display device (server), pieces of object data stored in pens respectively owned by teachers and to download the stored pieces of object data, for example.

It is further possible to store the downloaded pieces of object data in a different pen by performing a copy operation, which allows cooperation between the plurality of pens.

Here, it is possible to limit, for each pen, display of pieces of object data upon a paste operation or a drag-and-drop operation on the basis of attribute information (for example, identification information of the pen).

Accordingly, it is possible to put limitations on available pieces of object data depending on whether a teacher or a student uses the pieces of object data or in accordance with administrative privilege to thereby reduce the chance of the pieces of object data being compromised, for example, or assure confidentiality of the pieces of object data.

When the attribute information is stored together with the content data, it is possible to take countermeasures so as to reduce the chance of the content data being altered or compromised, for example.

Further, it is possible to impose a copy limitation, for example, on the basis of attribute information about a piece of object data. Accordingly, it is possible to put a limitation on a piece of object data for which a plurality of pens are allowed to perform a copy operation, for example, which results in copyright protection, for example.

16. Modifications

The present disclosure is not limited to the above-described embodiments, and various modifications can be made. That is, any embodiment obtained by combining technical features modified as appropriate without departing from the spirit of the present disclosure also falls within the technical scope of the present disclosure.

The above-described embodiments may be combined as appropriate and implemented as long as no contradiction arises, as a matter of course, in addition to any combination described above.

A program that runs on each of the devices in the embodiments is a program that controls a CPU and so on (a program that causes a computer to function) so as to implement the functions of the above-described embodiments. Information processed by each of the devices is temporarily stored in a temporary storage device (for example, a random access memory (RAM)) when being processed. Thereafter, the information is stored in a storage device of any type, such as a read-only memory (ROM) or an HDD, and reading of, correction of, or writing to the information is performed by the CPU as needed.

A recording medium for storing the program may be any medium, namely, a semiconductor medium (for example, a ROM or a non-volatile memory card), an optical recording medium or a magneto-optical recoding medium (for example, a digital versatile disc (DVD), a magneto-optical disc (MO), a mini disc (MD), a compact disc (CD), or a Blu-ray disc (BD)), or a magnetic recording medium (for example, a magnetic tape or a floppy disc). The functions of the above-described embodiments are implemented when the program is loaded and executed. In addition, the functions of the present disclosure may be implemented when processing is performed on the basis of instructions of the program and by the program cooperating with an operating system or other application programs, for example.

In a case of distributing the program, the program can be stored in a portable recording medium and distributed or can be transferred to a server computer that is connected via a network, such as the Internet. In this case, a storage device of the server computer is also included in the present disclosure, as a matter of course.

Part or all of each of the devices in the above-described embodiments may be typically implemented as an integrated circuit, namely, a large-scale integration (LSI) circuit. The functional blocks of each of the devices may be individually implemented as chips, or some or all of the functional blocks may be integrated into a chip. The method for circuit integration is not limited to LSI, and circuit integration may be implemented by using a dedicated circuit or a general-purpose processor. In a case where a new technique for circuit integration that replaces LSI emerges with the advancement of semiconductor technology, an integrated circuit based on such a technique can be used, as a matter of course.

The present disclosure contains subject matter related to that disclosed in Japanese Priority Patent Application JP 2016-108721 filed in the Japan Patent Office on May 31, 2016 and Japanese Priority Patent Application JP 2017-076121 filed in the Japan Patent Office on Apr. 6, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display system comprising:
a control unit that controls a display device; and
an input device capable of communicating with the control unit, wherein
the input device includes:
a storage unit that stores one or more pieces of object data, and
a transmission unit that transmits the one or more pieces of object data stored in the storage unit to the control unit in response to an object data request from the control unit, and
the control unit:
transmits the object data request to the input device in response to a paste operation performed by using the input device,
displays, as thumbnails, the one or more pieces of object data in a first display area of the display device in response to a reception of the one or more pieces of object data from the input device,
stores the one or more pieces of object data corresponding to a thumbnail that is selected as object data in the storage unit when the thumbnail is selected by an operation of enclosing at least one thumbnail of the thumbnails displayed on the first display area with the input device,
determines an enlarged display size of the selected thumbnail in accordance with a size of a second display area of the display device, and
displays, while the thumbnails are displayed in the first display area, the selected object data in the enlarged display size in the second display area of the display device.

2. The display system according to claim 1, wherein the paste operation is one of an operation of a paste button displayed on the display device, a specific gesture operation, and an operation of a paste button provided on the input device.

3. The display system according to claim 1, wherein the selection operation is an operation of moving the selected piece of object data from the first display area to the second display area of the display device and placing the selected piece of object data in the second display area.

4. The display system according to claim 1, wherein
the control unit
obtains at least one piece of object data among the one or more pieces of object data displayed on the display device in response to the selection operation, and
transmits the at least one piece of object data to the input device in response to a copy operation performed by using the input device, and
the input device stores the at least one piece of object data transmitted from the display device in the storage unit.

5. The display system according to claim 4, wherein
in the first display area and the second display area, a copy button used to perform the copy operation and a paste button used to perform the paste operation are displayed, and
the copy operation is an operation of the copy button, and the paste operation is an operation of the paste button.

6. The display system according to claim 4, wherein the copy operation and the paste operation are different specific gesture operations.

7. The display system according to claim 4, wherein
the input device further includes
a copy button used to perform the copy operation, and
a paste button used to perform the paste operation, and
the copy operation is an operation of the copy button, and the paste operation is an operation of the paste button.

8. The display system according to claim 4, wherein the control unit obtains the at least one piece of object data in a case where the selection operation is performed while a user is touching the display device.

9. The display system according to claim 4, wherein the storage unit of the input device stores the one or more pieces of object data together with attribute information that represents attributes.

10. The display system according to claim 9, wherein the control unit transmits the object data request to the input device in response to the paste operation in order to request the one or more pieces of object data and the attribute information, and displays, in the first display area of the display device, the one or more pieces of object data from the input device as thumbnails in association with the attribute information.

11. The display system according to claim 1, wherein the control unit deletes the selected piece of object data among the one or more pieces of object data displayed in the first display area of the display device as thumbnails when the selected piece of object data is displayed in the second display area of the display device.

12. The display system according to claim 1, wherein the control unit
displays content data in the second display area of the display device, and
moves and places the selected piece of object data in the content data displayed in the second display area to thereby paste the selected piece of object data into the content data.

13. The display system according to claim 1, wherein the control unit
displays content data that includes the one or more pieces of object data in the second display area of the display device,
obtains at least one piece of object data among the one or more pieces of object data included in the displayed content data in response to the selection operation, and
transmits the at least one piece of object data to the input device in response to a copy operation performed by using the input device, and
the input device stores the at least one piece of object data transmitted from the control unit in the storage unit.

14. An input device used in the display system according to claim 1.

15. A display system comprising:
a server that controls a display device; and
an input device capable of communicating with the server, wherein
the input device includes:
  a storage unit that stores a plurality of pieces of identification information for identifying a plurality of pieces of object data respectively, and
  a transmission unit that transmits the plurality of pieces of identification information stored in the storage unit of the input device to the server in response to an identification information request from the server, and
the server:
  includes a storage unit that stores the plurality of pieces of object data,
  transmits the identification information request to the input device and displays the plurality of pieces of object data respectively corresponding to the plurality of pieces of identification information from the input device in a first display area of the display device as thumbnails in response to a paste operation performed by using the input device,
  stores the one or more pieces of object data corresponding to a thumbnail that is selected as object data in the storage unit when the thumbnail is selected by an operation of enclosing at least one thumbnail of the thumbnails displayed on the first display area with the input device,
  determines an enlarged display size of the selected thumbnail in accordance with a size of a second display area of the display device, and
  displays, while the thumbnails are displayed in the first display area, the selected object data in the enlarged display size in the second display area of the display device.

16. A display device capable of communicating with an input device including a storage unit that stores one or more pieces of object data, the display device comprising:
a transmission unit that transmits an object data request to the input device in response to a paste operation performed by using the input device;
a reception unit that receives the one or more pieces of object data transmitted from the input device in response to the object data request;
a thumbnail display unit that displays, as thumbnails, the received one or more pieces of object data in a first display area in response to a reception of the one or more pieces of object data from the input device; and
an object data display unit that:
  stores the one or more pieces of object data corresponding to a thumbnail that is selected as object data in the storage unit when the thumbnail is selected by an operation of enclosing at least one thumbnail of the thumbnails displayed on the first display area with the input device,
  determines an enlarged display size of the selected thumbnail in accordance with a size of a second display area of the display device, and
  displays, while the thumbnails are displayed in the first display area, the selected object data in the enlarged display size in the second display area.

17. The display device according to claim 16, wherein
the display device is capable of communicating with a plurality of input devices, and
the display device further comprises:
an object data selection unit that selects a piece of object data from among the one or more pieces of object data displayed in the second display area; and
an object data transmission unit that transmits the piece of object data selected by the object data selection unit to an input device different from an input device in which the selected piece of object data is stored among the plurality of input devices.

18. A display method for a display device capable of communicating with an input device including a storage unit that stores one or more pieces of object data, the display method comprising:
transmitting an object data request to the input device in response to a paste operation performed by using the input device;
receiving the one or more pieces of object data transmitted from the input device in response to the object data request;
displaying, as thumbnails, the received one or more pieces of object data in a first display area in response to a reception of the one or more pieces of object data from the input device;
storing the one or more pieces of object data corresponding to a thumbnail that is selected as object data in the storage unit when the thumbnail is selected by an operation of enclosing at least one thumbnail of the thumbnails displayed on the first display area with the input device;
determining an enlarged display size of the selected thumbnail in accordance with a size of a second display area of the display device; and
displaying, while the thumbnails are displayed in the first display area, the selected object data in the enlarged display size in the second display area.

* * * * *